US007891291B2

(12) United States Patent
Lorincz

(10) Patent No.: US 7,891,291 B2
(45) Date of Patent: Feb. 22, 2011

(54) DOUBLE LIFT TANK WINE PRESS

(75) Inventor: Thomas A. Lorincz, Hollister, CA (US)

(73) Assignee: Therma Corporation, Inc., San Jose, CA (US)

( * ) Notice: Subject to any disclaimer, the term of this patent is extended or adjusted under 35 U.S.C. 154(b) by 0 days.

(21) Appl. No.: 12/459,304

(22) Filed: Jun. 30, 2009

(65) Prior Publication Data

US 2009/0266248 A1    Oct. 29, 2009

Related U.S. Application Data

(60) Division of application No. 10/463,200, filed on Jun. 17, 2003, now Pat. No. 7,552,675, which is a continuation-in-part of application No. 10/273,695, filed on Oct. 18, 2002.

(51) Int. Cl.
   *B30B 9/06* (2006.01)
(52) U.S. Cl. ............... 100/110; 100/227; 100/229 A; 100/240; 100/269.01; 100/295; 100/915
(58) Field of Classification Search ............ 100/55, 100/59, 60, 100, 104, 107, 110, 126, 127, 100/214, 226, 229 A, 229 R, 240, 269.01, 100/295, 915; 99/276, 277.1, 349; 426/478, 426/489, 495; 210/132, 349
   See application file for complete search history.

(56) References Cited

U.S. PATENT DOCUMENTS

| 250,979 A | 12/1881 | Russell |
| 568,132 A | 9/1896 | Feroe |
| 784,183 A * | 3/1905 | Schaffer ............ 100/107 |
| 1,077,270 A | 11/1913 | Gettelman |
| 1,710,698 A * | 4/1929 | Green ............ 68/241 |
| 2,221,806 A * | 11/1940 | Loomis ............ 34/331 |
| 2,499,310 A * | 2/1950 | Hathaway et al. ........ 100/240 |

(Continued)

FOREIGN PATENT DOCUMENTS

DE    47279    7/1889

(Continued)

OTHER PUBLICATIONS

U.S. Appl. No. 10/273,695, Office Action dated Jul. 22, 2005.

(Continued)

*Primary Examiner*—Jimmy T Nguyen
(74) *Attorney, Agent, or Firm*—Henneman & Associates, PLC; Larry E. Henneman, Jr.

(57) ABSTRACT

A wine making apparatus includes an engaging mechanism for engaging a fermentation tank, and a press mechanism for pressing the wine making ingredients in the tank against an inner surface of the tank. In a described embodiment a tank has a pair of forklift attachment points and a movable platform on a wine press mechanism is adapted for receiving the forklift attachment points. A lifting apparatus raises the platform and tank such that the contents of the tank are crushed by a relatively fixed plate above the tank. A pair of hydraulic rams are connected in series such that fluid output from one raises the other, thereby assuring that the platform and tank are evenly raised.

144 Claims, 18 Drawing Sheets

U.S. PATENT DOCUMENTS

| | | | |
|---|---|---|---|
| 2,641,122 | A | 6/1953 | Cavagnaro, Jr. et al. |
| 3,137,228 | A | 6/1964 | Elow |
| 3,200,859 | A | 8/1965 | Parker |
| 3,242,851 | A | 3/1966 | Brawley et al. |
| 3,513,769 | A | 5/1970 | Sutter-Christ |
| 3,528,366 | A | 9/1970 | Neuenburg et al. |
| 3,635,145 | A | 1/1972 | Nardella |
| 3,685,438 | A | 8/1972 | Ziegler |
| 3,811,372 | A | 5/1974 | Lenz |
| 3,910,173 | A | 10/1975 | Zepponi |
| 3,911,807 | A | 10/1975 | Birnbaum |
| 3,921,511 | A | 11/1975 | Gall |
| 4,011,810 | A | 3/1977 | Santic |
| 4,019,984 | A | 4/1977 | Mohn |
| 4,524,685 | A | 6/1985 | Bergmann |
| 4,615,887 | A | 10/1986 | Hickinbotham |
| 4,922,815 | A * | 5/1990 | Teague ................ 100/219 |
| 5,579,688 | A | 12/1996 | Byrne et al. |
| 6,141,945 | A | 11/2000 | Becher |
| 6,203,826 | B1 | 3/2001 | Calvin |
| 7,552,675 | B2 * | 6/2009 | Lorincz ................ 100/110 |

FOREIGN PATENT DOCUMENTS

| | | |
|---|---|---|
| DE | 268374 | 12/1913 |
| DE | 25 15 158 A1 * | 10/1976 |
| DE | 3434170 | 9/1984 |
| DE | 19517937 A1 * | 11/1996 |
| FR | 382289 | 2/1908 |
| FR | 456323 | 8/1913 |
| FR | 589520 | 5/1925 |
| FR | 685242 | 7/1930 |
| FR | 732013 | 9/1932 |
| GB | 2044718 A * | 10/1980 |
| WO | WO01/28889 A1 | 4/2001 |

OTHER PUBLICATIONS

U.S. Appl. No. 10/273,695, Office Action dated Sep. 7, 2005.
U.S. Appl. No. 10/273,695, Office Action dated Mar. 9, 2006.
U.S. Appl. No. 10/273,695, Interview Summary dated Mar. 29, 2006.
U.S. Appl. No. 10/273,695, Office Action dated Dec. 20, 2006.
U.S. Appl. No. 10/273,695, Office Action dated Aug. 8, 2007.
U.S. Appl. No. 10/273,695, Appeal Brief dated Nov. 8, 2007.
U.S. Appl. No. 10/273,695, Notice of Non-Compliant Appeal Brief dated Nov. 28, 2007.
U.S. Appl. No. 10/273,695, Amended Appeal Brief dated Dec. 28, 2007.
U.S. Appl. No. 10/273,695, Notice of Examiner's Answer to Appeal Brief dated Apr. 3, 2008.
U.S. Appl. No. 10/273,695, Reply Brief dated Jun. 3, 2008.
U.S. Appl. No. 10/273,695, Notice of Reply Brief Consideration dated Jul. 31, 2008.
U.S. Appl. No. 10/273,695, BPAI Docketing Decision in Appeal No. 2009-1237 dated Nov. 6, 2008.
U.S. Appl. No. 10/273,695, BPAI Decision on Appeal in Appeal No. 2009-1237 dated Feb. 25, 2010.
U.S. Appl. No. 10/273,695, Notice of Appeal to the Federal Court of Appeals in Appeal No. 2010-1384 dated Apr. 26, 2010.
PCT Application No. PCT/US2003/032505, International Search Report dated Oct. 27, 2004.
AU Application No. 2003 301 547, Office Action dated Jan. 18, 2008.
AU Application No. 2003 301 547, Notice of Allowance dated Dec. 8, 2008.
EP Application No. 03809557.6-1253, European Search Report dated May 31, 2010.
EP Application No. 03809557.6-1253, Office Action dated Jun. 17, 2010.
NZ Application No. 539580, Office Action dated Jun. 11, 2007.
NZ Application No. 539580, Office Action dated Feb. 18, 2008.
NZ Application No. 539580, Notice of Allowance dated Oct. 20, 2008.
NZ Application No. 571576, Office Action dated Oct. 6, 2008.
NZ Application No. 571576, Office Action dated Jul. 14, 2009.
NZ Application No. 571576, Notice of Allowance dated Nov. 24, 2009.
U.S. Appl. No. 10/463,220, Office Action dated Feb. 15, 2006.
U.S. Appl. No. 10/463,220, Restriction Requirement dated Oct. 25, 2006.
U.S. Appl. No. 10/463,220, Office Action dated Feb. 22, 2007.
U.S. Appl. No. 10/463,220, Notice of Non-Compliant Amendment dated May 24, 2007.
U.S. Appl. No. 10/463,220, Office Action dated Aug. 22, 2007.
U.S. Appl. No. 10/463,220, Office Action dated May 1, 2008.
U.S. Appl. No. 10/463,220, Notice of Allowance dated Feb. 24, 2009.

* cited by examiner

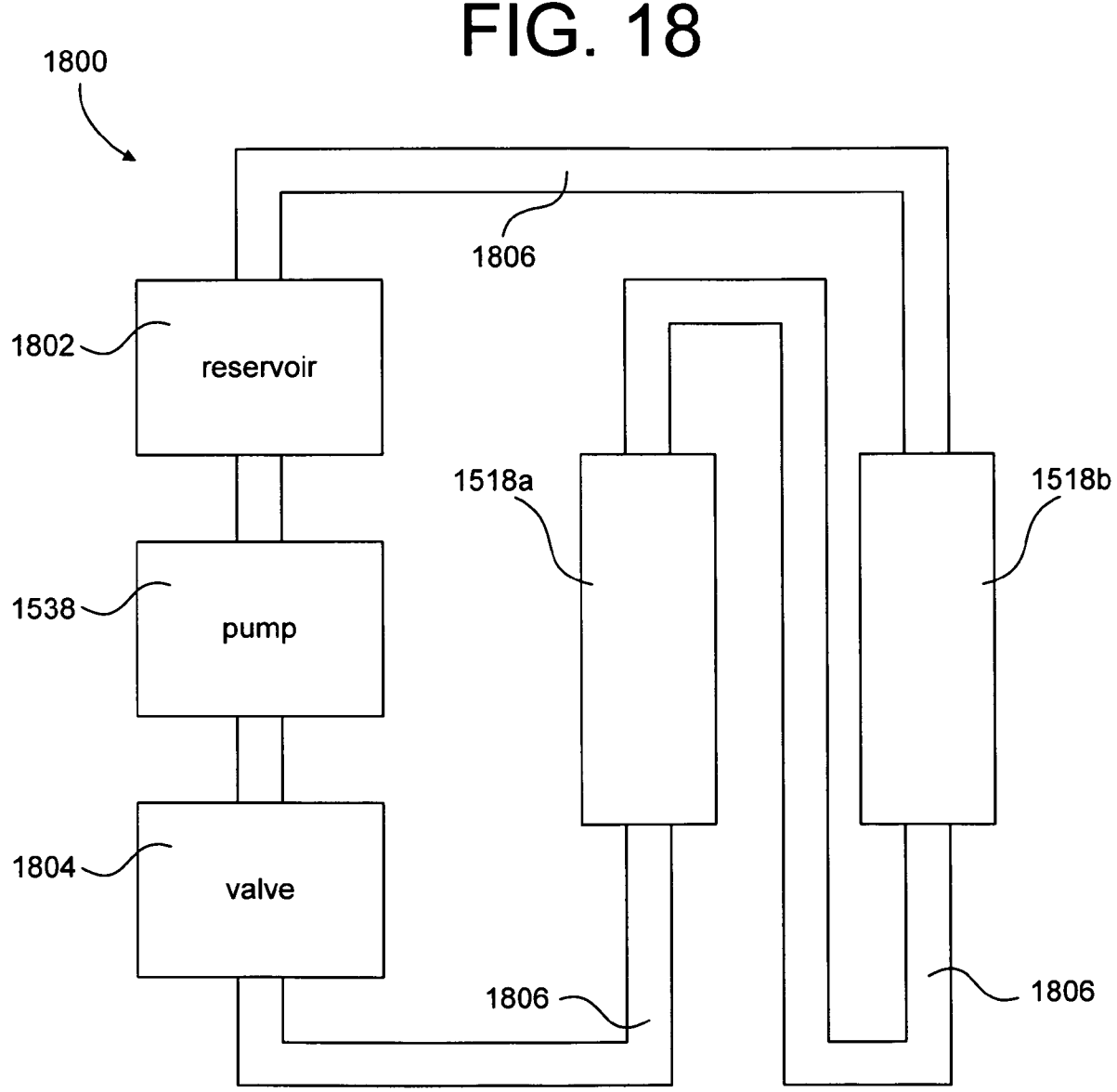

DOUBLE LIFT TANK WINE PRESS

RELATED APPLICATIONS

This application is a divisional of U.S. application Ser. No. 10/463,220 (now U.S. Pat. No. 7,552,675) filed Jun. 17, 2003, which is a continuation-in-part of U.S. application Ser. No. 10/273,695 filed Oct. 18, 2002, each of which is by the same inventor and is incorporated herein by reference in its entirety.

BACKGROUND OF THE INVENTION

1. Field of the Invention

This invention relates generally to wine making, and more particularly to a novel wine making apparatus and method that facilitates the pressing and fermentation of wine making ingredients in a single tank to produce wine.

2. Description of the Background Art

The art of wine making has traditionally been a lengthy and complicated process. Wine making processes include the crushing of wine grapes, pressing the grapes to separate the grape juice/wine from the grape solids, and fermenting the wine making ingredients. The primary operations used to produce wine result in a lengthy production process requiring transfer of the wine making ingredients between many machines and tanks. The repeated transfer of ingredients and the specialized machines involved make wine production a costly operation in terms of both labor and equipment.

Wine making is a highly specialized art that varies between producers. However, the above-mentioned operations are fairly consistent throughout the wine making field. In the first step of conventional wine production, grapes are loaded into a crusher. The crusher crushes the grapes producing a mixture of grape juice and solids (e.g. grape skins). The crusher is a large perforated cylinder, housing a series of paddles that rotate generally between 600-1200 rpm. The grapes are crushed and both the solid and liquid portions of the grapes exit the crusher. Because of their specialized nature, crushing machines are generally expensive to purchase and maintain.

In the case of white wines, following the crushing operation the crushed grapes must be moved to a pressing machine to separate the liquids and solids. Depending on the application, grape juice can be extracted from the liquid-solid mixture using any combination of the following processes. First, the "free run juice" can be extracted from the liquid-solid mixture by straining. To accomplish this, the crushed grapes are fed into containers having a screened bottom and/or sides, which allows grape juice to exit while retaining the solids in the screened containers. Alternately, the crushed grapes are put into a horizontal "basket press" and the crushed grapes are pressed from both sides. The juice exits the basket press through perforations in the side walls of the press. In another process, a continuous screw press may be used to press the crushed grapes. Yet another type of press utilizes a perforated cylindrical portion that rotates, and an inflatable bladder placed within the cylinder along with the crushed grapes. The bladder is inflated and the crushed grapes are pressed against the rotating cylinder walls forcing the grape juice out of the press.

Fermentation is common to all wine making processes. During fermentation, the grape juice (optionally, the entire grapes) is transferred to a fermentation tank for a number of weeks. When fermentation is done before the pressing operation (typically with red wines) the grape skins float on top of the free run juice/wine. These grape skins must be attended to and stirred several times a day to permit the fermenting grape juice to breathe and remain at an appropriate temperature. After primary fermentation, the wine is pressed as required.

Many of the machines used to make wine are expensive and difficult to maintain. Straining is an inexpensive alternative to the other pressing devices (e.g., the continuous screw press, the bladder press, the basket press, etc.), however the strainer would often clog and require constant attention from workers. Additionally, the present methods employed to produce wine require transferring the crushed grapes between many different machines and tanks, resulting in a high cost of labor and increased chance of contamination.

What is needed, therefore, is an apparatus and method that reduces the variety of equipment required to make wine. What is also needed is an apparatus and method that reduces the number of times that the wine making ingredients must be transferred between various machines and or tanks. What is also needed is an apparatus and method that cost-effectively simplifies wine production.

SUMMARY

The present invention overcomes the problems associated with the prior art by providing a novel apparatus and method for making wine. The invention facilitates simple, inexpensive crushing, pressing, and fermenting of the wine making ingredients in a single tank.

In one embodiment of the invention, a wine making apparatus includes an engaging mechanism adapted to engage a tank, and a press mechanism coupled to the engaging mechanism. The press mechanism presses the contents of the tank against an inner surface of the tank. In the particular disclosed embodiment, the inner surface of the tank is continuously formed (e.g., no inlet/outlet ports, no plumbing through the walls of the tank, etc.).

The press mechanism includes a press plate for placement within the tank, whereby the ingredients can be pressed against the inner surface of the tank. The press plate has generally the same shape and dimensions as the inner shape and dimensions of the tank. In a particular embodiment, the press plate and the tank are round, and the press plate presses the contents of the tank against the bottom of the tank (i.e., the press plate moves toward the bottom of the tank). Of course, the pressed contents also exert force on the side walls of the tank.

The press plate includes a number of optional features designed to permit fluid to flow past the press plate, while retaining solids on one side of the press plate. For example, in one embodiment, the press plate includes a plurality of apertures (i.e., is perforated) to allow wine to flow therethrough, while retaining solid material on the underside. As another example, the press plate defines a bypass opening adapted to receive a bypass tube to further facilitate the flow of liquid past the press plate through the bypass opening. The bypass tube includes a plurality of apertures to permit liquids to flow through the bypass tube, while keeping solid material out of the bypass tube. In one particular embodiment, the wall of the bypass tube has solid sections at each end, and defines the apertures between the solid end sections. In an even more particular embodiment, the bypass tube can slide within the bypass opening and is retained therein by a retaining device.

In a particular embodiment, the press mechanism includes a frame for receiving the tank and supporting the press plate within the tank. The frame includes a first portion coupled to the engaging mechanism, and a second portion coupled to the press plate. The first portion of the frame detachably engages the second portion of the frame to position the press plate within the tank. The first portion of the frame includes a plurality of legs. The second portion includes a body, a first plurality of legs coupled to the body for engaging the legs of the first portion of the frame, and a second plurality of legs coupled to the body at one end and to the press plate at the other end. Optionally, at least one of the legs of the first portion of the frame is shorter than the other legs to make the loading/unloading of the tank into/from the frame easier.

In a particular embodiment, the second portion of the frame includes a cross-frame, a first plurality of legs, and a second plurality of legs. The first plurality of legs extend perpendicularly from the cross-frame at positions beyond the perimeter of the tank. The second plurality of legs extend perpendicularly from the cross-frame, but at positions within the perimeter of the tank. The press plate is mounted to the second plurality of legs such that the press plate is supported within the tank when the first plurality of legs engage the first portion of the frame.

The wine pressing apparatus also includes at least one drive mechanism for moving the engaging mechanism (and thus the tank) with respect to the second portion of the frame. In one embodiment the drive mechanism comprises a power cylinder (e.g., a single or double acting hydraulic cylinder, pneumatic cylinder, etc.).

In a particular embodiment the first portion of the frame is held in a fixed position with respect to the second portion of the frame (and thus the press plate). The engaging mechanism includes a tray for receiving the tank, and the drive mechanism includes at least one lifting mechanism, adapted to lift the tray with respect to the first portion of the frame. As the tray and tank are lifted, the press plate is forced toward the bottom of the tank. Optionally, a plurality of lifting mechanisms are arranged around the perimeter of the tray. A leveling sensor mounted to the tray provides a leveling signal to a control system. The control system, responsive to the leveling signal, is operative to independently drive each of the lifting mechanisms to keep the tank level during a press operation.

In an alternative embodiment, the first portion of the frame is fixed with respect to the tank, and the press plate is fixed to the second portion of the frame. The first portion of the frame is movably coupled to the second portion of the frame, and the drive mechanism moves the second portion of the frame with respect to the first portion of the frame. Optionally, the frame includes a plurality of drive mechanisms coupled between the first portion and second portion of the frame.

Optionally, the pressing apparatus includes an alignment mechanism for aligning the tank with respect to the press mechanism. In a particular embodiment, the alignment mechanism includes a plurality of concentric recesses formed in the bottom of a tray to receive tanks of various sizes in a centered position. In a more particular embodiment, the concentric recesses are formed by a plurality of selectively removable rings fixed to the base of the tray.

In an alternate embodiment, the alignment mechanism comprises a plurality of alignment blocks fixed to the first portion of the frame to align the tank with the press mechanism. For example, where the first portion of the frame includes a plurality of upwardly extending legs, the alignment blocks can each be mounted to a respective one of the legs. Optionally, the alignment blocks include tapered upper ends to help guide the tank into alignment as the tank is lowered into the frame.

The pressing apparatus is also transportable. In one embodiment, the frame includes a plurality of wheels, allowing the apparatus to be easily moved about a winery by workers. In another embodiment, the frame includes a plurality of guideways for receiving the forks of a lift truck. In yet another embodiment, the frame includes one or more lifting eyes to engage a hoist.

A method of making wine is also described. The method includes the steps of placing ingredients in a tank, fermenting the ingredients in the tank, and pressing the ingredients in the tank to separate the liquid from the solid ingredients. The step of pressing the ingredients within the tank can be repeated, as necessary, depending on the particular wine making process. The tank can be removed from the press mechanism between pressing operations if desired. Similarly, the tank can be removed from, or left in, the press mechanism while the ingredients in the tank are fermenting. Further, the pressing operation(s) can be performed before and/or after fermentation.

Optionally, the ingredients can be cooled during the fermentation process. One particular method of cooling includes removing the tank from the pressing apparatus and inserting the tank into a slightly larger cooling tank.

The liquid ingredients (i.e., the wine) can be removed from the fermentation tank either before or after any post-fermentation pressing operations. In one method, the step of removing the liquid ingredients includes pressing the ingredients after the fermentation step but before removing any liquid from the tank. After the liquid ingredients are removed, the tank is removed from the pressing apparatus, and the solid ingredients are removed from the tank. In an alternate method, a first portion of the liquid ingredients (i.e., the free-flow wine) is removed prior to any post-fermentation pressing operations. Then, the remaining contents are pressed, and any additional liquid resulting from the pressing operation is removed.

In one particular method, the wine is removed from the tank by suctioning. Optionally, the wine is withdrawn through a perforated tube (e.g., the bypass tube).

Yet another described embodiment of the invention uses only two lift tubes, and has a tank adapted for being lifted by a forklift, and which can be moved generally straight into the press mechanism.

BRIEF DESCRIPTION OF THE DRAWINGS

FIG. 18 is a diagrammatic representation of a hydraulic system such as might be used with some embodiments of the invention.

DETAILED DESCRIPTION

The present invention overcomes the problems associated with the prior art by providing a novel apparatus and method for making wine. The invention facilitates simple, inexpensive crushing, pressing, and fermenting of the wine making ingredients in a single tank. In the following description, numerous specific details are set forth (e.g. tank alignment means, frame shape, etc.) in order to provide a thorough understanding of the invention. Those skilled in the art will recognize, however, that the invention may be practiced apart from these specific details. In other instances, details of well known wine making practices (e.g., wine making recipes, fermentation times, etc.) and components have been omitted, so as not to unnecessarily obscure the present invention.

Figure 1:
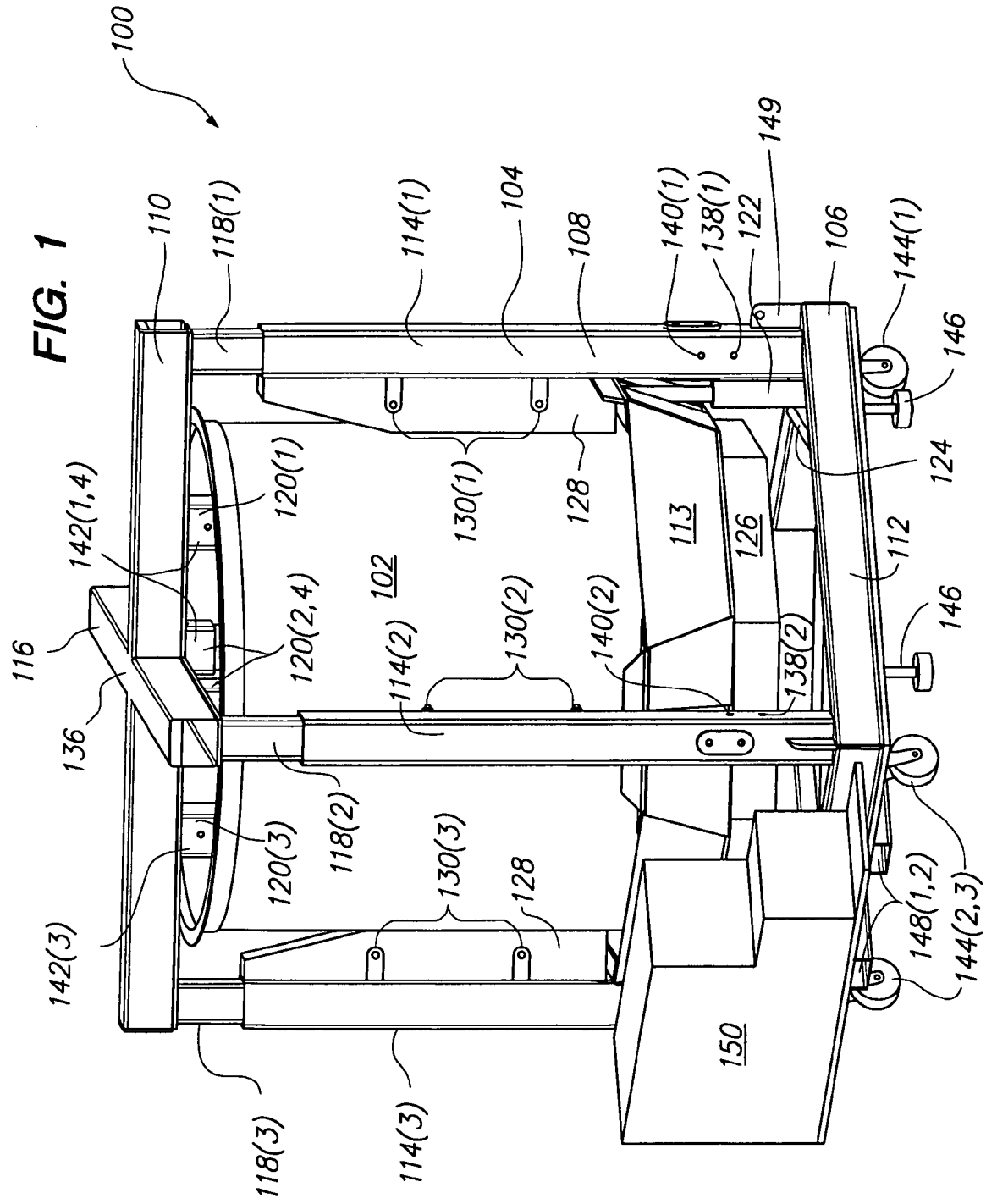
FIG. 1 is a perspective view of a wine making apparatus according to the present invention.

FIG. 1 shows a wine making apparatus 100 including a tray 113 for engaging a tank 102, and a press mechanism 104 for pressing the contents of tank 102. Tank 102 holds the wine making ingredients (i.e. grapes, yeast, sugar, etc.) throughout the fermentation and pressing steps of the wine making process. In the present embodiment, tank 102 is made of stainless steel, and the walls of tank 102 are formed continuously (e.g., no plumbing fixtures through the walls of tank 102). The smooth, continuous walls of tank 102 eliminate recesses and/or cavities where solid materials might gather creating difficult areas to clean. Further, because tank 102 is not hard plumbed, it remains mobile, and can be inserted/removed from apparatus 100 as desired.

Press mechanism 104 includes a frame 106 having a first portion 108 and a second portion 110. First portion 108 of frame 106 includes a base 112, and a plurality of legs 114(1-4) extending vertically upward from base 112. Second portion 110 of frame 106 includes a body 116, a first plurality of legs 118(1-4), and a second plurality of legs 120(1-4). Legs 118 (1-4) of second portion 110 removably engage legs 114(1-4) of first portion 108, to facilitate assembly of frame 106. A press plate 302 (not visible in the view of FIG. 1) is mounted to the lower ends of legs 120(1-4).

Base 112 of first portion 108 of frame 106 is comprised of tubular members forming a generally square shape. Legs 114(1-4) are welded to and extend upwardly from the corners of base 112. Base 112 further includes an internal structure 124 formed in an octagonal shape to receive an octagonal portion 126 of tray 113. As will be described in greater detail below, base 112 also provides a point of attachment for several optional features (e.g., wheels, forklift guides, etc.).

Tray 113 is movably fixed to base 112 by a plurality of drive mechanisms 122(1-4) (only one is visible in the view of FIG. 1). In the present embodiment, drive mechanisms 122(1-4) are hydraulic cylinders, arranged around the perimeter of base 112, adjacent legs 114(1-4). Each drive mechanism is coupled to base 112 at one end, and to tray 113 at the other. When activated, drive mechanisms 122(1-4) raises tray 113 with respect to base 112. In FIG. 1, tray 113 is shown in a raised position. However, during operation, tray 113 has a range of motion from a position where tray 113 is seated in internal structure 124 of base 112, to a position where tank 102 would contact body 116 of second portion 110 of frame 106.

First portion 108 of frame 106 further includes a plurality of alignment mechanisms 128(1-4). In this particular embodiment, each of alignment mechanisms 128(1-4) includes an alignment block fixed to one of legs 114(1-4), via a plurality of fasteners 130(1-4). Each of alignment blocks 128(1-4) is tapered on its upper end to align and guide tank 102 as tank 102 is lowered into tray 113. Note that second portion 110 of frame 106 is removed during the loading and unloading of tank 102.

Second portion 110 of frame 106 engages first portion 108, to hold press plate 302 stationary with respect to base 112. Then, when drive mechanisms 122(1-4) raise tray 113, the bottom surface of tank 102 moves toward press plate 302, pressing the contents of tank 102 against the bottom and side surfaces of the inside of tank 102.

In this particular embodiment, body 116 of second portion 110 is formed as a tubular stainless steel cross-frame 136. Each one of legs 118(1-4) extends perpendicularly from a distal end of cross-frame 136, at positions beyond the perimeter of tank 102. Legs 118(1-4) are also formed of tubular stainless steel, and are welded to cross-frame 136. Cross-frame 136 also includes a plurality of collars 142(1-4), for mounting second plurality of legs 120(1-4) to cross-frame 136. Second plurality of legs 120(1-4) extend perpendicularly from cross-frame 136, at a position within the perimeter of tank 102. Legs 120(1-4) are formed from tubular stainless steel, and support press plate 302 in position within tank 102.

Legs 118(1-4) each slide into a respective one of legs 114(1-4) of first portion 108 of frame 106. Each of legs 114(1-4) includes a stop pin hole 138(1-4) and a lock pin hole 140(1-4), respectively. Legs 118 also include lock pin holes (not visible). After insertion, each of legs 118(1-4) slide down into a respective one of legs 114(1-4), until reaching a stop pin (not shown) inserted into each of stop pin holes 138(1-4). Lock pins (not shown) are then inserted through each of lock pin holes 140(1-4) (and the aligned lock pin holes of legs 118(1-4), thereby locking each pair of respective legs 114, 118 together.

Wine making apparatus 100 further includes a plurality of wheels 144(1-4) fixed to base 112 near a corner. Wheels 144(1-4) facilitate easy transport of press mechanism 104, with or without tank 102. Optionally, base 112 includes one or more guide ways 148(1-2) to facilitate transport of wine making apparatus 100 with a forklift or the like. As yet another option, apparatus 100 may include lifting brackets 149 to facilitate hoisting by an overhead crane.

The transportability of apparatus 100 provides an important advantage over the prior art. In particular, bringing the press mechanism to each set of fermentation tanks is easier than bringing each fermentation tank to a fixed position press machine. After pressing the contents of one tank, the press mechanism need only be moved a few feet to the next adjacent set of tanks. In contrast, the current practice requires each fermentation tank to be brought, perhaps several hundred feet or more, to a fixed pressing machine.

Other optional features of press mechanism 104 include a plurality of guide wheels 146(1-4) and a step housing 150. Guide wheels 146(1-4) are fixed to base 112 to guide the movement of apparatus 100 within preformed tracks within a winery. Step housing 150 houses and protects a pump and a control system (not visible in FIG. 1) for powering and controlling drive mechanisms 122 and leveling tank 102 during a press operation. Step housing 150 is step shaped and sufficiently rigid to allow a wine maker to stand thereon, in order to access tank 102.

Wine making apparatus 100 operates as follows. Initially, second portion 110 of frame 106 is removed from wine making apparatus 100. Tank 102 is loaded into tray 113 by a lifting device (i.e. a crane, a hoist, etc.) and is aligned by alignment devices 128. Tank 102 is loaded with wine making ingredients. Each of legs 118(1-4) of second portion 110 of frame 106 are inserted into a respective one of legs 114(1-4) of first portion 108 of frame 106, until legs 118(1-4) are stopped by lock pins 138(1-4). Press plate 302 (FIG. 3) will now be positioned in tank 102. Lock pins are inserted into lock pin holes 140(1-4), locking second portion 110 of frame 106 to first portion 108. Responsive to instructions generated by the control system, drive cylinders 122 lift tray 113 with respect to second portion 110 of frame 106 and attached press plate 302. The wine making ingredients within tank 102 are pressed against the inner (bottom) surface of tank 102, separating the liquids (i.e. the grape juice) from the solids (i.e. the grape skins, stems, etc.). During the pressing operation, tank 102 is maintained in a level position by the control system driving each of cylinders 122(1-4) independently.

The wine making ingredients are then fermented in the tank. Tank 102 is typically removed from press mechanism 104 during fermentation, but can be left in press mechanism 104 if desired. Following fermentation, the ingredients of tank 102 are pressed again, and then removed from tank 102.

It should be noted that pressing the contents of tank 102 before fermentation is optional. In some cases, a partial pre-fermentation press step aids the fermentation process.

In an alternate embodiment, each of drive mechanisms 122(1-4) comprise double acting hydraulic cylinders and are attached between first portion 108 and second portion 110 of frame 106. The alternate embodiment illustrates that pressing action can be achieved by moving separate portions of a frame with respect to one another, as opposed to moving the engaging device (tray 113) with respect to frame 106.

Figure 2:
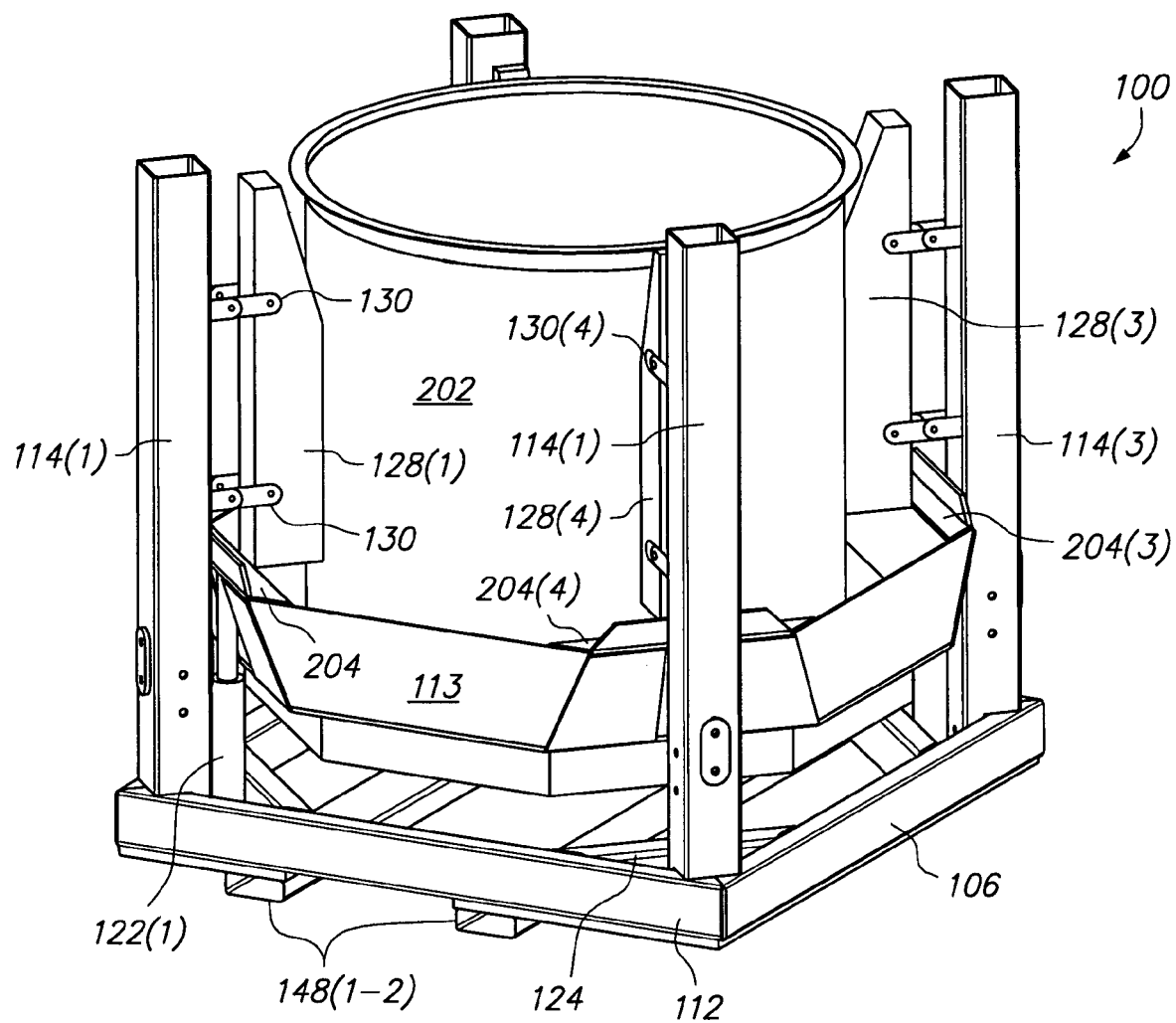
FIG. 2 shows the wine making apparatus of FIG. 1 having a portion of its frame removed.

FIG. 2 shows an alternate view of wine making apparatus 100, with second portion 110 of frame 106 removed. In the view of FIG. 2, a smaller tank 202 has been loaded into tray 113. Note that, in this view, alignment blocks 128(1-4) have been moved inward toward the smaller tank 202 to properly align smaller tank 202 within tray 113. Note also that fasteners 130(1-4) include pivoting linkages fastened between each alignment block 130 and a respective one of legs 114(1-4).

FIG. 2 also shows certain elements of wine making apparatus 100 in greater detail. For example, guide ways 148(1-2) (e.g., forklift pockets) are shown to extend laterally across the underside of base 112 forming a portion of internal structure 124. Note also that each of legs 114(1-4) is fixed in and above each corner of base 112. Further, each drive mechanism 122 (1-4) (only one shown) is disposed adjacent the inside edge of a respective one of legs 114(1-4), and is fixed to a portion of base 112 (not visible) at one end. The opposite end of each drive mechanism 122(1-4) engages tray 113 under an associated lip 204. Positioning each of drive mechanisms 122 around the perimeter of tray 113 facilitates balanced and level lifting of tray 113 during a press operation.

Figure 3:
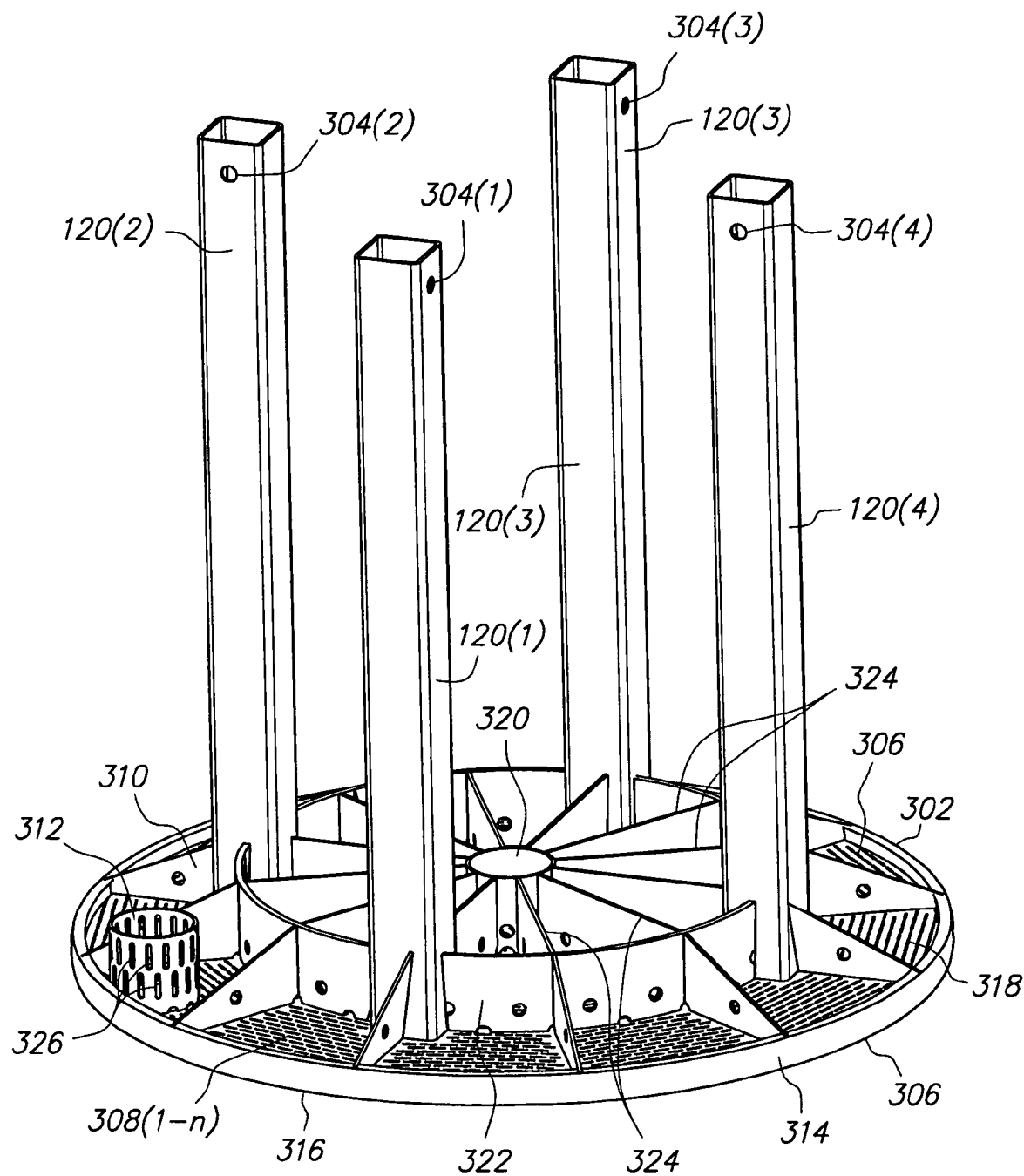
FIG. 3 is a perspective view of a press plate.

FIG. 3 shows second plurality of legs 120(1-4) of second portion 110 of frame 106 fixed to press plate 302. Legs 120 (1-4) engage cross-frame 136 (not shown) at respective collars 142(1-4), and are secured thereto with a pin inserted through each of collar holes 304(1-4). It should be understood that alternate fastening means (e.g., bolts, welding, etc.) may be used to fix legs 120(1-4) to cross-frame 136.

Press plate 302 includes a pressing surface 306, a plurality of apertures 308(1-n) formed through pressing surface 306, a structural grid 310, a bypass opening 312, a mating lip 314, an underside 316, and a topside 318. Press plate 302 is formed from stainless steel, and surface 306 is designed to conform to the shape and dimensions (circular in the present embodiment) of tank 102. Although press plate 302 and tank 102 can be formed in other shapes (e.g., square or other polygon), the inventors have found that a circular shape results in a dramatically stronger structure for tank 102. Apertures 308(1-n) comprise elongated slots formed in pressing surface 306, and facilitate the flow of fluid (e.g. grape juice or wine) through pressing surface 306, while retaining solid material on underside 316.

Press plate 302 mates with tank 102 (or tank 202) at mating lip 314. Mating lip 314 creates a sufficient seal between press plate 302 and a sidewall of tank 102 to prevent excess solid material from flowing past press plate 302. Optionally, a rubber flange or O-ring (not shown) can be seated to mating lip 314 to create a tighter seal between press plate 302 and a sidewall of tank 102.

Structural grid 310 strengthens and supports press plate 302. Structural grid 310 includes a first circular member 320, a second circular member 322, and a plurality of radial members 324(1-n). First circular member 320 is of small diameter and located centrally on press plate 302. Second circular member 322 is concentric to first circular member 320, and has a larger diameter. Radial members 324(1-n) extend outwardly from first circular member 320, and traverse second circular member 322, ending near mating lip 314. Additionally, first circular member 320, second circular member 322, and radial members 324 each extend vertically from and perpendicular to the plane defined by pressing surface 306, and resist both torsion and bending stresses that could cause deformation of pressing surface 306. Such deformation of pressing surface 306 could allow solid material to flow past press plate 302 and or result in jamming between press plate 302 and the wall of tank 102.

Figure 5:
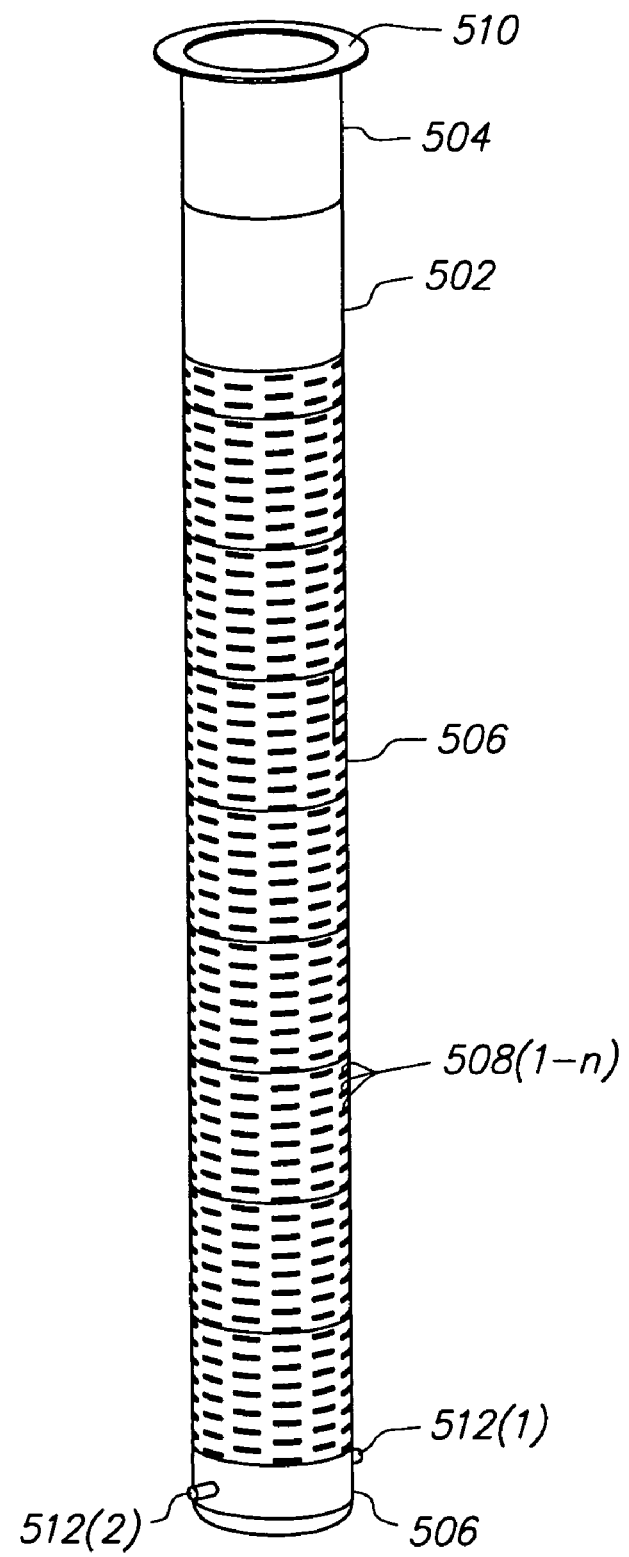
FIG. 5 is a perspective view of a bypass tube used with the press plate of FIG. 4.

Bypass opening 312 extends vertically through pressing surface 306. Bypass opening 312 is designed to receive a bypass tube 502 (FIG. 5). Bypass tube 502 is designed to slide freely within bypass opening 312. Additionally, bypass opening 312 defines a plurality of apertures 326 that permit liquid to flow through the wall of bypass opening 326. As will be described in greater detail below, bypass tube 502 is designed to lock into bypass opening 326, to prevent extraneous movement of bypass tube 502 when second portion 110 of frame 106 is mounted to or removed from first portion 108 of frame 106.

Bypass opening 312 and bypass tube 502 serve at least two purposes. First, bypass opening 312 and bypass tube 502 provide an outlet path for fluids so as not to clog apertures 308 of pressing surface 306 during a pressing operation. Second, bypass opening 312 and bypass tube 502 facilitate the removal of strained liquids from tank 102 before or after a pressing operation. For example, before a pressing operation, a suction tube can be inserted through bypass tube 502 and bypass opening 312 to withdraw free-flow wine.

Figure 4:
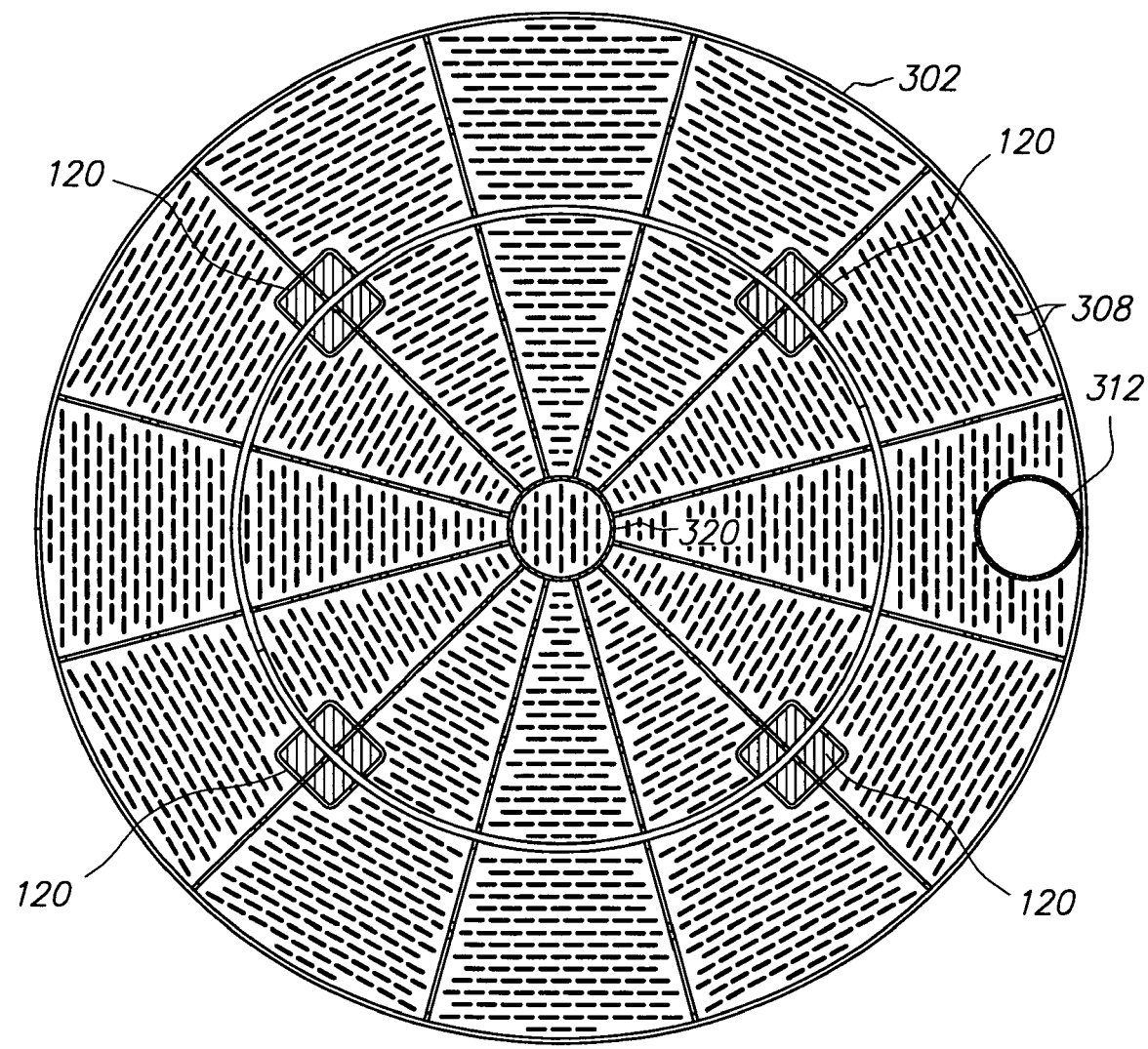
FIG. 4 is a top view of the press plate of FIG. 3.

FIG. 4 is a top view of press plate 302, showing that some of apertures 308(1-n) are located inside first circular member 320. Additionally, note that legs 120(1-4) are sealed (marked by cross-hatching), in order to prevent liquid from flowing up into them during a pressing operation.

FIG. 5 is a perspective view of bypass tube 502. The wall of bypass tube 502 includes a solid upper end section 504, a solid lower end section 506, a perforated center section 506 defining a plurality of elongated apertures 508(1-n). Bypass tube 502 further includes a retaining lip 510 and a plurality of keeper pins 512(1-2).

As indicated above, one function of bypass tube 502 is to facilitate fluid flow past press plate 302 to prevent apertures 308(1-n) from getting clogged with solid debris. An additional function of bypass tube 502 is to permit fluid to be suctioned (i.e. siphoned, pumped, etc) out of tank 102 before, during, or after a pressing operation.

Wine withdrawn prior to a pressing operation is referred to as "free-flow" wine. Free flow wine is typically located between solid debris resting on the bottom of tank 102, and other solid debris (e.g. grape skins) floating on the top of the fluid in tank 102. The perforated center section of the wall of bypass tube 502 allows the free flow wine to flow into bypass tube 502, where it can be conveniently withdrawn.

Retaining lip 510 and keeper pins 512(1-2) serve as retaining devices to prevent bypass tube 502 from falling through or being forced out of bypass opening 312. Additionally, keeper pins 512(1-2) engage complementary receivers (not shown) in bypass opening 312, to lock bypass tube 502 to press plate 302 when press plate 302 is being placed in or removed from tank 102.

Figure 6:
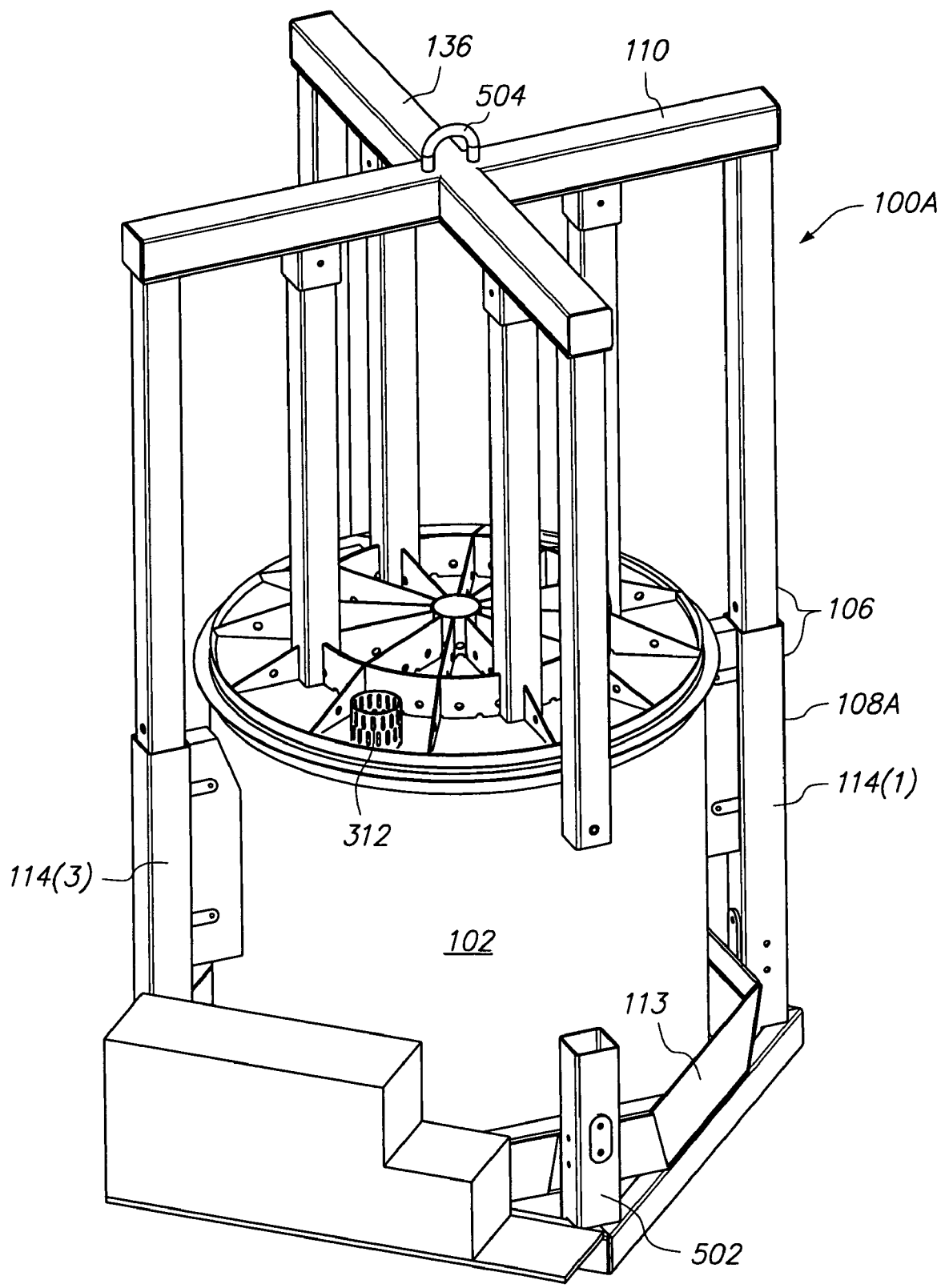
FIG. 6 shows the wine making apparatus of FIG. 1, with a first portion of its frame being inserted in a second portion of its frame.

FIG. 6 shows a wine making apparatus 100A as second portion 110 is being mounted to a first portion 108A of frame 106. Note that first portion 108A of frame 106 includes one leg 502 that is shorter than the remaining legs 114(1-3). Alternate leg 502 reduces the height that tank 102 must be lifted to be placed into tray 113.

Additionally, cross-frame 136 includes a transport ring 504 coupled thereto. Transport ring 504 facilitates lifting second portion 110 of frame 106 into place by a forklift, a hoist, a crane, or other similar device.

Bypass tube 502 is omitted from the view of FIG. 6. It should be understood, however, that bypass tube 502 is typically fixed into bypass opening 312 during assembly of frame 106. Optionally, bypass tube 502 can be inserted into bypass opening 312 after press plate 302 is inserted into tank 102.

Figure 7:
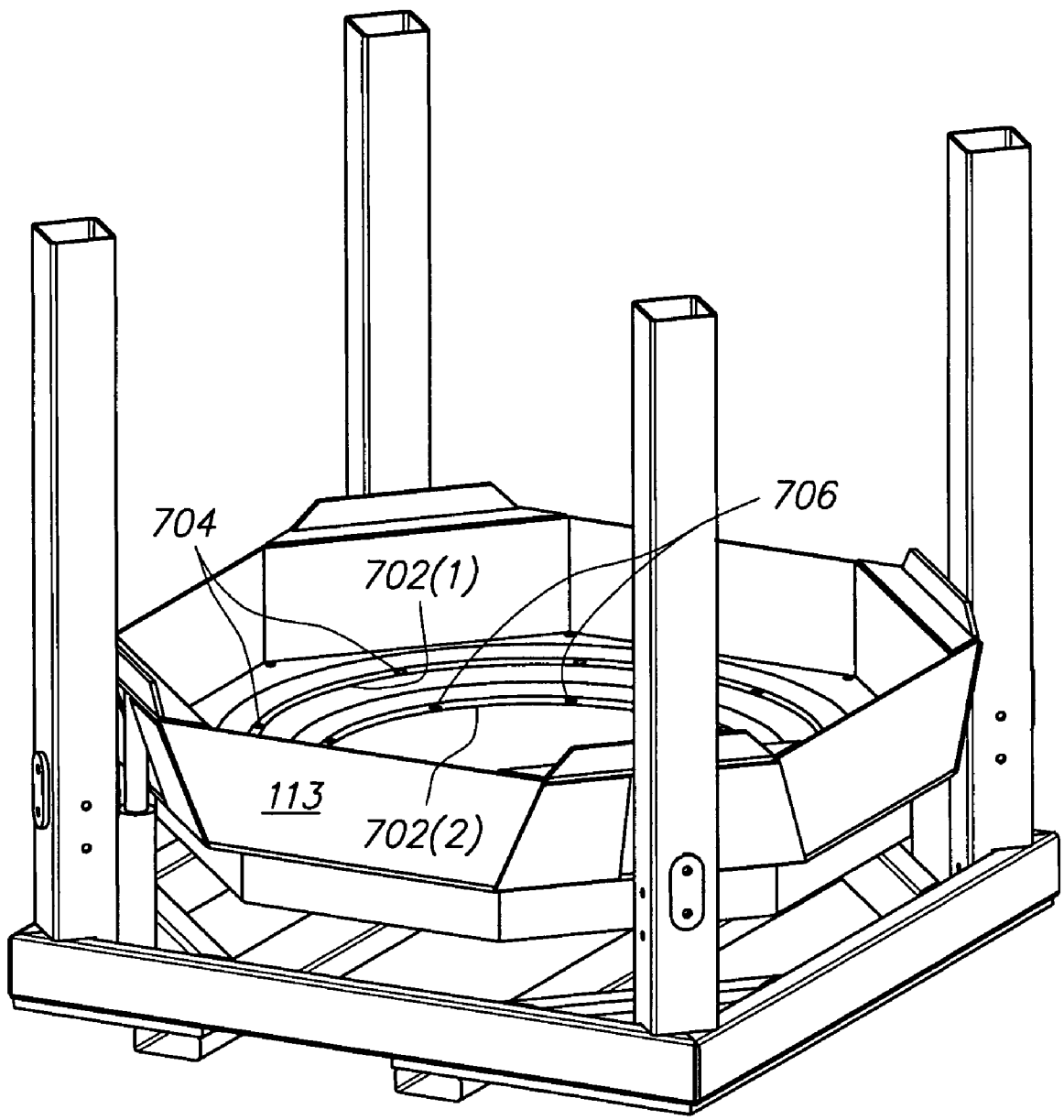
FIG. 7 is a perspective view of the lower portion of the frame, with the tank removed.

FIG. 7 shows tray 113 to include an alternate alignment mechanism. In particular, a plurality of concentric alignment rings 702(1-2) is fixed to the bottom of tray 113, and serve to properly align tanks of different sizes within tray 113. Alignment ring 702(1) and alignment ring 702(2) have diameters slightly larger than tank 102 and tank 202, respectively, and form two concentric recesses to receive tanks 102 and 202. Alignment ring 702 is coupled to the base of tray 113 with a plurality of fasteners 704(1-n) (e.g. nuts and bolts, etc.). Likewise, alignment ring 702(2) is coupled to tray 113 with a plurality of fasteners 706(1-n).

In the present embodiment, alignment rings 702(1-2) are formed from stainless steel having a base portion for receiving fasteners 704(1-n) or fasteners 706(1-n) respectively, and a guide portion bent upward from the base portion. The guide portions guide tanks 102 and 202 into rings 702(1) and 702(2), respectively.

When larger tank 102 is to be loaded into tray 113, smaller alignment ring 702(2) must be removed so that tank 102 seats properly in tray 113. To remove alignment ring 702(2), fasteners 706(1-n) are removed using standard methods (i.e. by ratcheting). Once alignment ring 702(2) is removed from tray 113, tank 102 can be placed therein. Alignment ring 702(1) need not be removed in order to place tank 202 into tray 113, because it is of larger diameter than tank 202, and would therefore, not interfere with the seating of tank 202 in tray 113.

It should be understood that many variations of the concentric recesses formed in tray 113 are possible. For example, a greater or lesser number of alignment rings can be used, depending on the number of different size tanks to be used with apparatus 100. Additionally, sections of rings can be used instead of entire rings. As yet another example, concentric recesses can be formed integrally in tray 113 (e.g., like stepped nested cups), thereby eliminating the need to remove rings to accommodate different size tanks.

Figure 8:
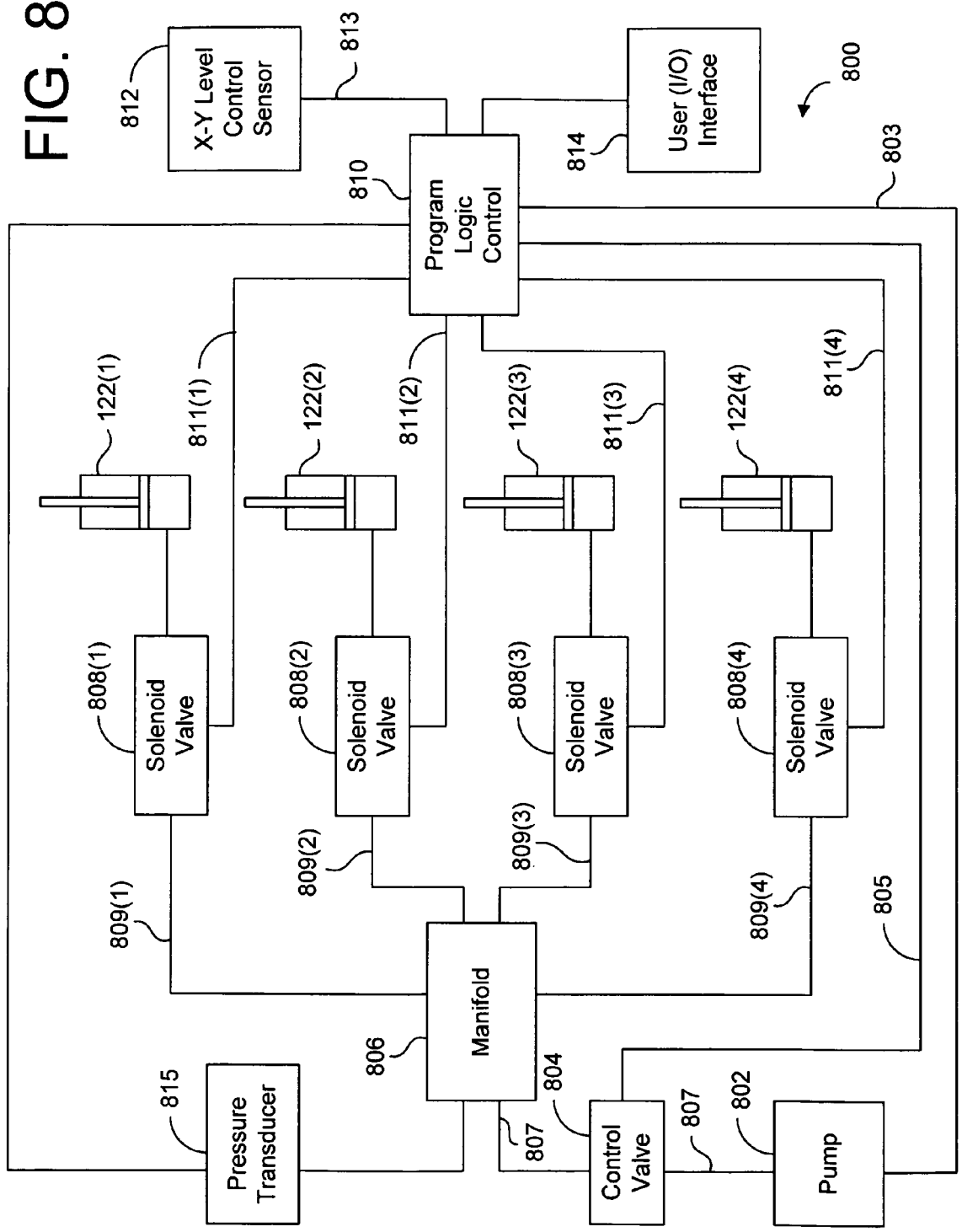
FIG. 8 is a block diagram of a control system for use with the wine making apparatus of FIG. 1.

FIG. 8 shows a control system 800 for performing and controlling the press operation of wine making apparatus 100. Control system 800 includes a pump 802, a pump control line 803, a control valve 804, a valve control line 805, a manifold 806, a manifold supply line 807, a plurality of solenoid valves 808(1-4), and a plurality of solenoid valve fluid lines 809(1-4). Each of solenoid valves 808(1-4) powers a respective one of power cylinders 122(1-4). Additionally, control system 800 is shown to include a program logic control (PLC) unit 810, a plurality of solenoid control lines 811(1-4), a level control sensor 812, a sensor communication line 813, and a user input/output interface 814.

The components of control system 800 function as follows. Pump 802 is a standard hydraulic pump that supplies high-pressure hydraulic fluid to manifold 806 via manifold supply line 807. Pump 802 receives hydraulic fluid from a fluid reservoir, which has been omitted for clarity. Control valve 804 is an automated or manually operated hydraulic valve that selectively transfers the fluid pressure produced by pump 802 to manifold 806, responsive to control signals received from PLC 810 via line 805. Manifold 806 distributes the hydraulic fluid pressure to each of solenoid valves 808(1-4) via solenoid valve fluid lines 809(1-n). Each of solenoid valves 808(1-4) drive a respective one of cylinders 122(1-4), responsive to control signals from PLC 810.

PLC unit 810 controls and coordinates the pressing process, responsive to signals from level control sensor 812 (e.g., a multi-pole mercury switch) and user input/output device 814 (e.g., press and release buttons). Responsive to a begin pressing operation signal from user I/O 814, PLC 810 transmits a signal, via line 805, causing control valve 804 to open. When control valve 804 opens, hydraulic pressure from pump 802 is communicated, via line 807, manifold 806, and lines 809(1-4) to the front ends of solenoid valves 808(1-4). Then, responsive to control signals from PLC 810 on lines 811(1-4), solenoid valves 808(1-4) open, transferring hydraulic pressure to cylinders 122(1-4), respectively, thereby causing tray 113 to begin to rise.

Tray 113 can be maintained in a level position during a pressing operation, because solenoid valves 808(1-4) are each operative, responsive to separate signals generated by PLC unit 810, to independently pressurize a respective one of power cylinders 122(1-4). During a pressing operation, PLC unit 810 monitors a signal from level control sensor 812. Level control sensor 812 is fixed to the underside of tray 113 and is in communication with PLC unit 810 via sensor communication line 813. Level control sensor 812 generates the leveling signal based on the roll and pitch of tray 113 during a press operation. Responsive to the leveling signal from level control sensor 812, PLC unit 810 independently drives each of power cylinders 122(1-4) by controlling a respective one of solenoid valves 808(1-4), to keep tray 113 level.

Control system 800 can also be operated in a manual mode. In the manual mode, solenoid valves 808(1-4) are initially in an open position and control valve 804 is in a closed position. Control valve 804 is manually operated (i.e. by a worker) using a lever-type selector switch (not shown). In one embodiment, the selector switch would have a "raise tank"

position, a "stop" position, and a "lower tank" position. When the selector switch is in the "raise tank" hydraulic pressure is communicated to all power cylinders 122(1-4) to raise tank 102. When the selector switch is in the "stop" position, the current pressure to cylinders 122(1-4) is maintained. Finally, when the selector switch is in the "lower tank" position, hydraulic pressure is released from cylinders 122(1-4). PLC 810 maintains tray 113 in a level position by independently controlling solenoid valves 808(1-4), responsive to a signal from level sensor 812. Another option would be to use an alternate pump designed to provide an equal flow volume to each of cylinders 122(1-4).

Whether the pressing operation is controlled manually or automatically, the press cycles can be carried out over an extended period of time in either stepped or ramped pressure profiles. For example, a pressure transducer 815 provides feedback to PLC 810, indicative of the fluid pressure in manifold 806. The fluid pressure in manifold 806 is related to the pressure of the pressed contents of tank 102. As tray 113 is raised, the fluid pressure from manifold 806 initially rises, but then drops off after fluid contents of tank 102 flow past press plate 302. Then, tray 113 is raised again. This process repeats until tray 113 and tank 102 are in the fully raised position.

In this embodiment, pump 802, pump control line 803, control valve 804, switch control line 805, manifold 806, manifold supply line 807, and solenoid valves 808(1-4), solenoid valve fluid lines 809(1-4), and PLC unit 810 are all housed within step housing 150. The manual control lever of control valve 804 can either protrude through housing 150, or be accessible through an opening in housing 150.

Figure 9:
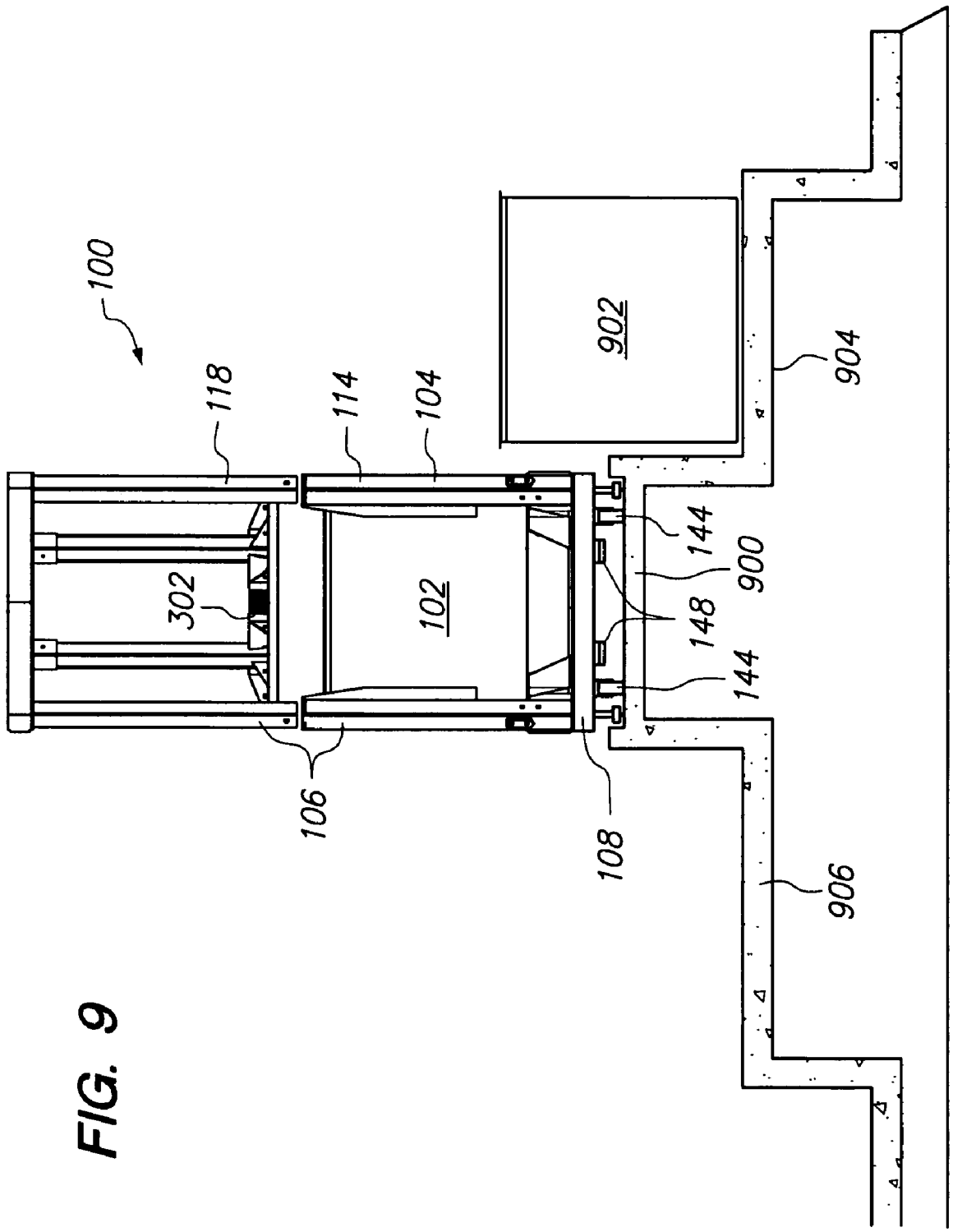
FIG. 9 shows the wine making apparatus of FIG. 1 as a mobile unit, situated within a track, in a winery.

FIG. 9 shows wine making apparatus 100 on a runway 900 in a winery. Tank 102 is inserted in press mechanism 104, and a second tank 902 is seated on a deck 904. Wine making apparatus 100 can be rolled on its wheels 144(1-4) along runway 900, between decks 904 and 906. In this way, a single press mechanism 104 can be used to press the ingredients of many tanks (i.e. tank 902 and others not shown). For example, apparatus 100 can be rolled along between two rows of tanks (not shown) on decks 904 and 906, pressing the contents of each tank in turn. Tanks are lifted into and out of apparatus 100 by a hoist, crane, lift truck, or the like.

Figure 10:
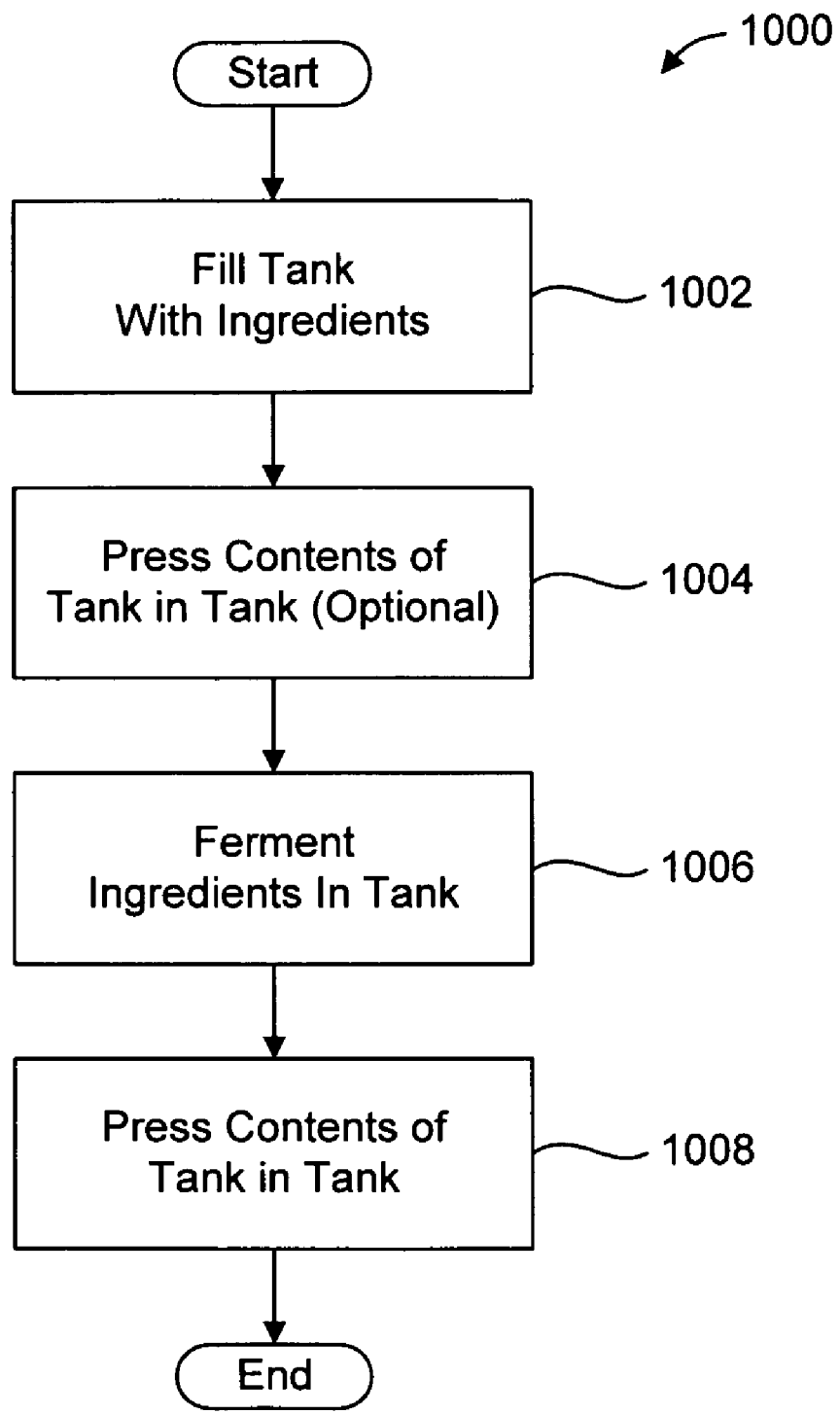
FIG. 10 is a flowchart summarizing one method of making wine according to the present invention.

FIG. 10 is a flow chart summarizing one method 1000 for making wine according to the present invention. In a first step 1002, tank 102 is filled with wine making ingredients (i.e. wine grapes, yeast, etc.). Then, in an optional second step 1004, the wine making ingredients are pressed within tank 102 before they are fermented. Next, in a third step 1006, the wine making ingredients are allowed to ferment in tank 102. Then, in a fourth step 1008, the contents of tank 102 are pressed within tank 102, to separate the fermented liquids from the solids.

Figure 11:
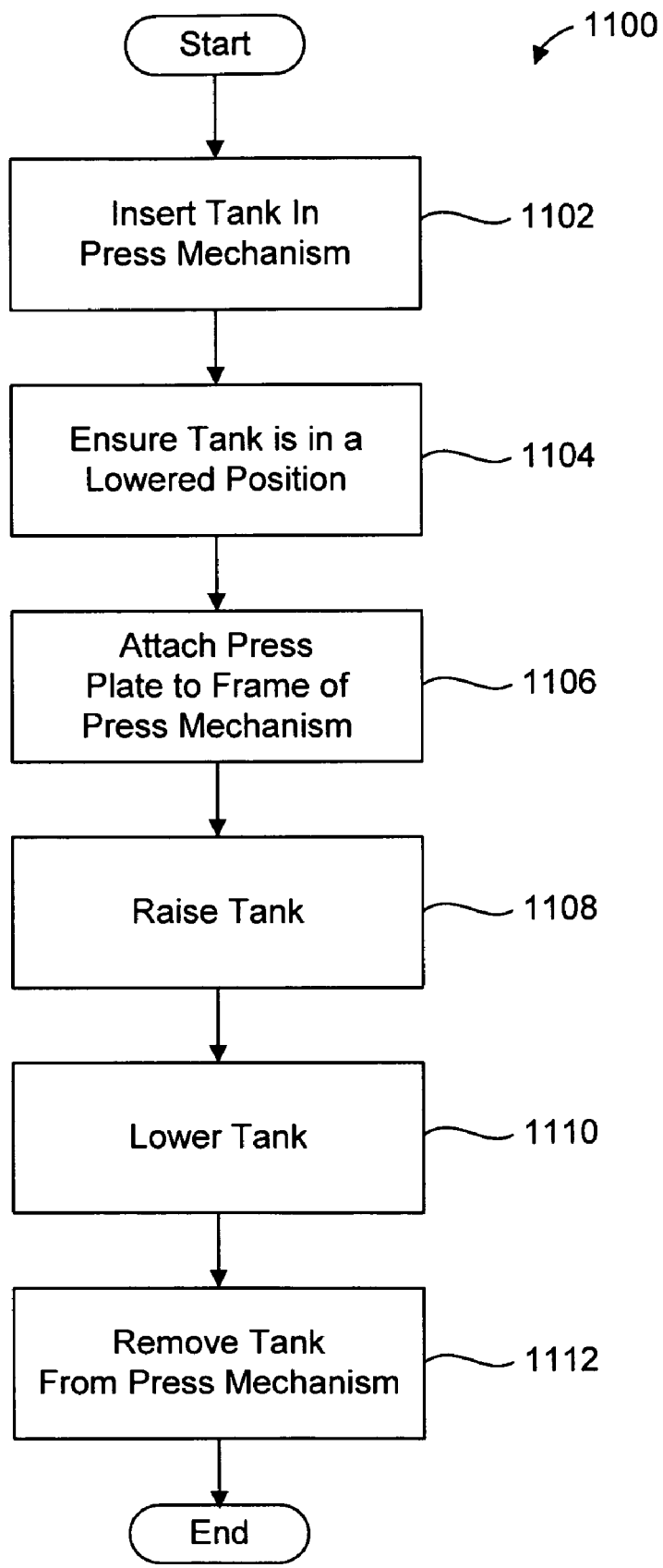
FIG. 11 is a flowchart summarizing one method of performing the second step or fourth step (press contents in tank) of the method of FIG. 10.

FIG. 11 is a flow chart summarizing one method 1100 of performing optional second step 1004 (press contents of tank) of method 1000. In a first step 1102, tank 102 is inserted into tray 113 of apparatus 100. Next, in a second step 1104, control system 800 ensures that tray 113, and thus tank 102, is in a lowered position by lowering each of power cylinders 122(1-4). Then, in a third step 1106, press plate 302 is attached to second portion 110 of frame 106, and second portion 110 is engaged with first portion 108 of frame 106, positioning press plate 302 in tank 102. Next, in a fourth step 1108, responsive to control system 800, power cylinders 122(1-4) raise tray 113 and tank 102, pressing the ingredients of tank 102 between press plate 302 and a wall (the bottom) of tank 102, at least partially separating the liquids and the solids. Then, in a fifth step 1110, power cylinders 122(1-4) are depressurized, lowering tray 113 and tank 102. Finally, in a sixth step 1112, tank 102 is removed from press mechanism 104, to allow the pressed contents to ferment.

Figure 12:
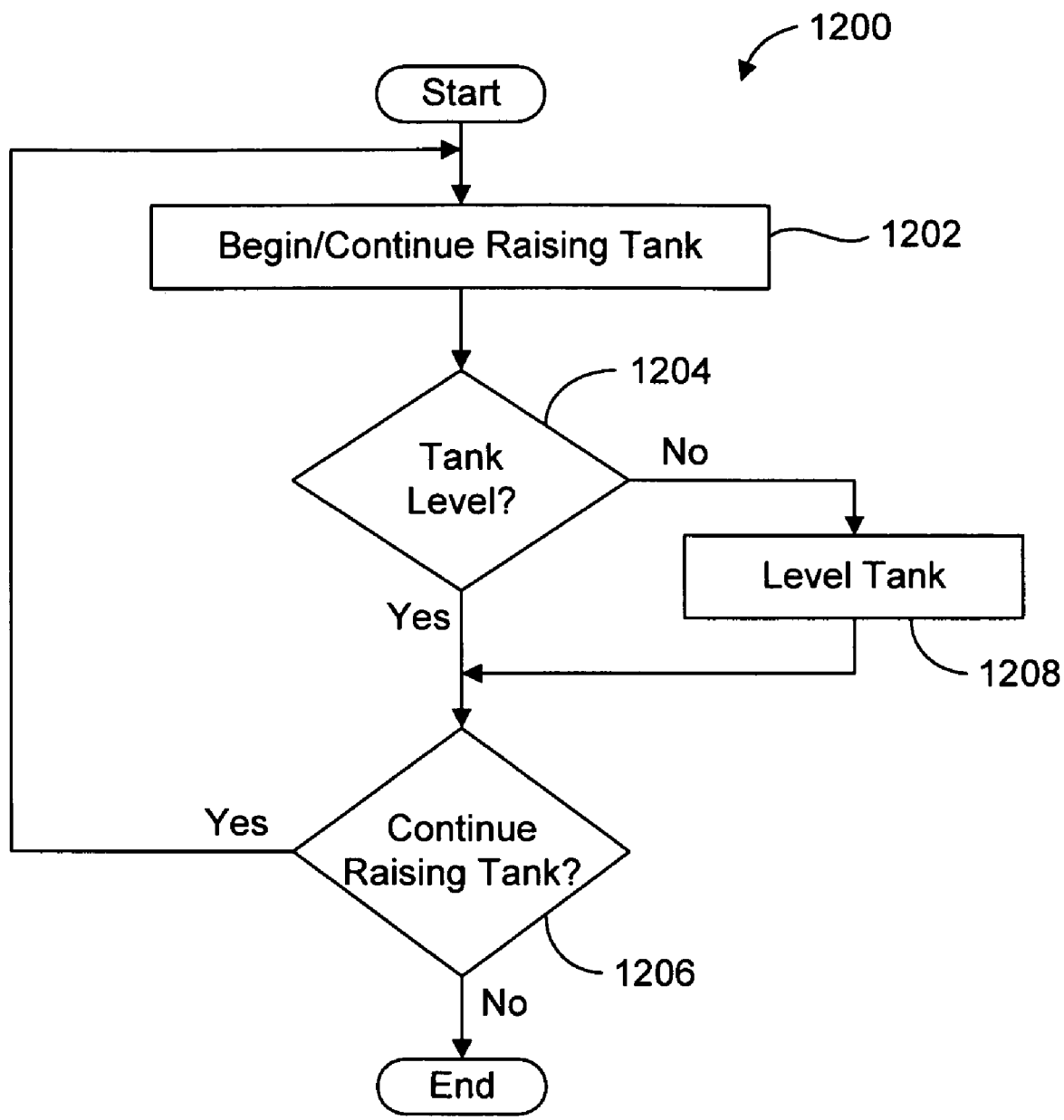
FIG. 12 is a flowchart summarizing one method of performing the fourth step (raise tank) of the method of FIG. 11.

FIG. 12 is a flow chart summarizing one method 1200 of performing fourth step 1108 (raise tank) of method 1100. In a first step 1202, PLC unit 810 of control system 800 pressurizes power cylinders 122(1-4) to begin raising tank 102. Then in second step 1204, PLC unit 810 evaluates the signal from level control sensor 812 to determine if tank 102 is level. If tank 102 is level, then in a third step 1206 PLC unit 810 determines if tank 102 should continue being raised (e.g., by checking input from user I/O 814, limiting sensors, etc.). If PLC unit 810 determines that tank 102 should continue being raised, then method 1108 returns to first step 1202. Otherwise, method 1200 ends.

Figure 13:
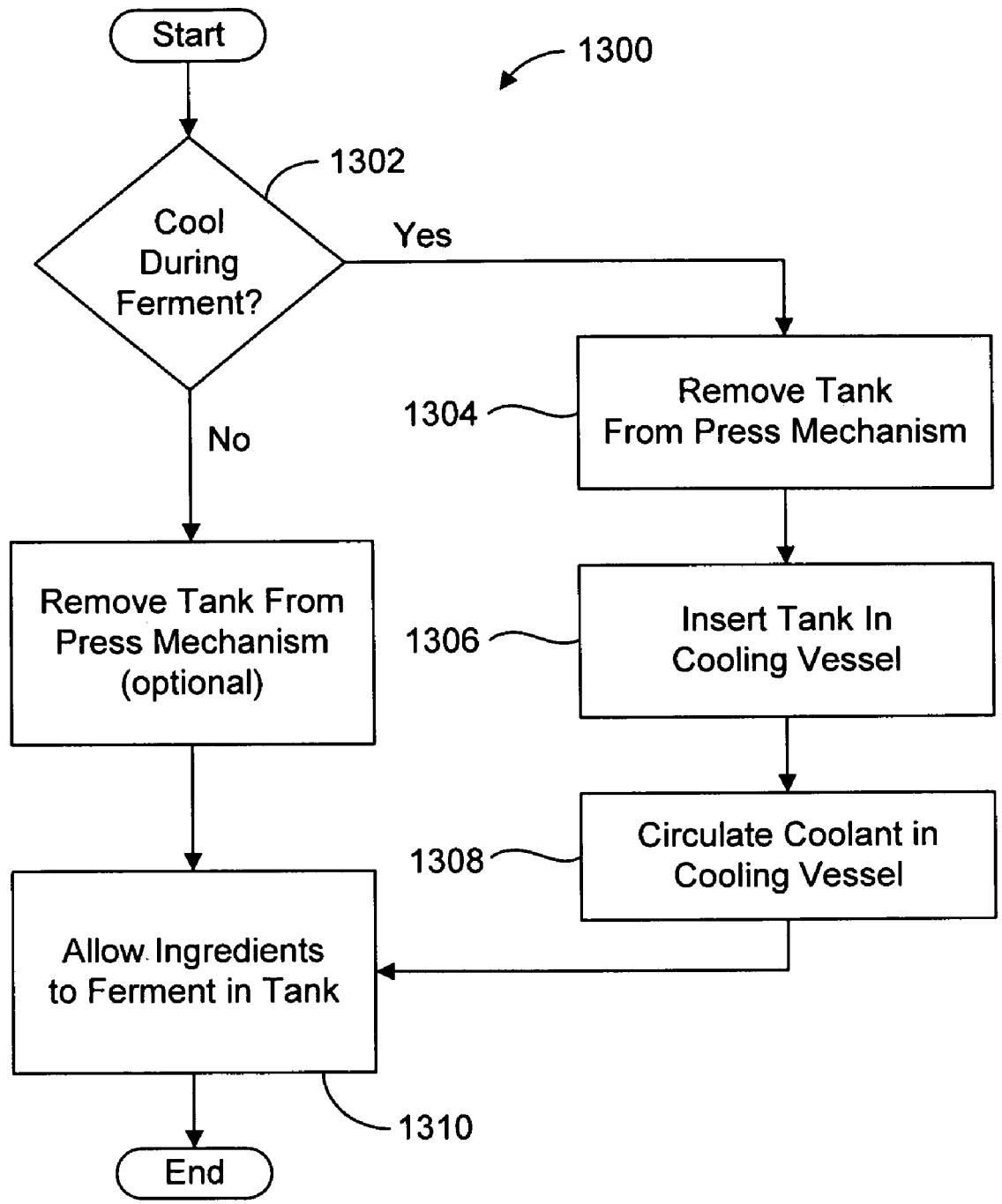
FIG. 13 is a flowchart summarizing one method of performing the third step of the method of FIG. 10.

If in second step 1204 PLC unit 810 determines that tank 102 is not level, then in a fourth step 1208 PLC unit 810 independently drives power cylinders 122(1-4) to level tank 102 before proceeding to third step 1206. I FIG. 13 is a flow chart summarizing a method 1300 of performing third step 1006 (ferment ingredients in tank) of method 1000. In a first step 1302, the wine maker determines if he wants to cool the wine making ingredients while they are fermenting in tank 102. If so, then in a second step 1304 tank 102 is removed from press mechanism 104, and in a third step 1306, tank 102 is inserted into a cooling vessel. Note that tank 102 can be inserted into the cooling vessel prior to being filled with ingredients if the pre-fermentation press step 1004 of method 1000 is omitted. Next, in a fourth step 1308, cooling fluid is circulated throughout the cooling vessel to keep the wine making ingredients of tank 102 at an appropriate predetermined temperature. Then in a fifth step 1310, the ingredients in tank 102 are allowed to ferment in tank 102 at the predetermined temperature.

If in first step 1302, the wine maker determines that the ingredients of tank 102 do not need to be cooled, then method 1300 proceeds to an optional sixth step 1310, where tank 102 is removed from apparatus 100, to free apparatus 100 to press other tanks of wine. Afterwards, method 1300 proceeds to fifth step 1310.

Figure 14:
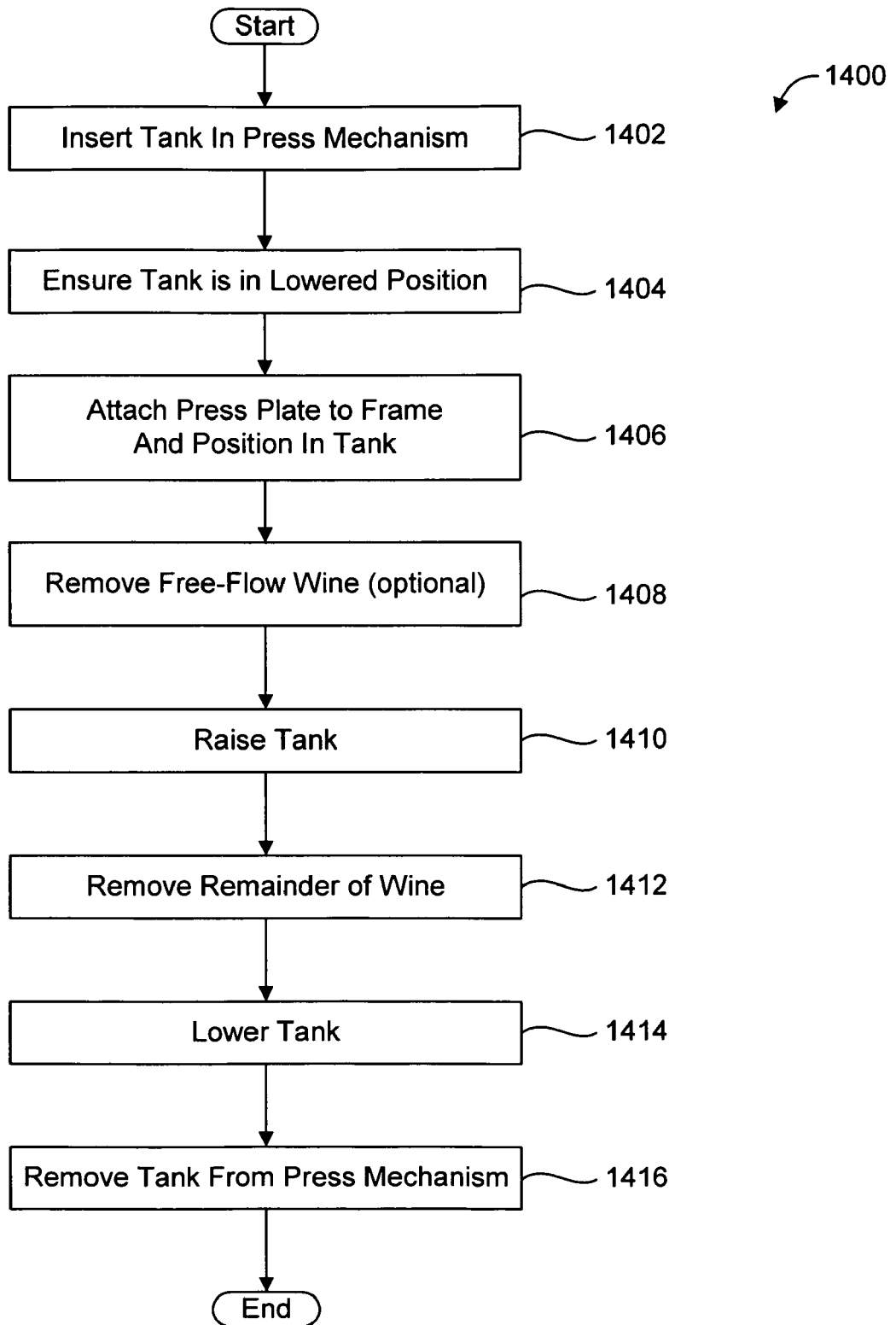
FIG. 14 is a flowchart summarizing one method of performing the fourth step of FIG. 10.

FIG. 14 is a flow chart summarizing a method 1400 of performing fourth step 1008 (post-fermentation pressing of contents of tank) of method 1000. In a first step 1402, tank 102 is inserted into press mechanism 104. Then, in a second step 1404, PLC unit 810 ensures that tank 102 is in a lowered position. Next, in a third step 1406, press plate 302 is attached to second portion 110 of frame 106, and second portion 110 is engaged with first portion 108 of frame 106, positioning press plate 302 in tank 102. Then, in an optional fourth step 1408, the "free flow" wine is withdrawn from tank 102 before the press operation. Next, in a fifth step 1410, tank 102 is raised with respect to press plate 302, thereby pressing the contents of tank 102 against the bottom of tank 102. It should be noted that method 1200 of FIG. 12 can also be used to perform step 1410 as well. After tank 102 is raised, the remainder of the wine contained in tank 102 is removed in a sixth step 1412. Then in a seventh step 1414, tank 102 is lowered. Finally, in an eighth step 1416, second portion 110 of press mechanism 104 is removed, and tank 102 is removed from press mechanism 104, and can be cleaned as needed.

Figure 15:
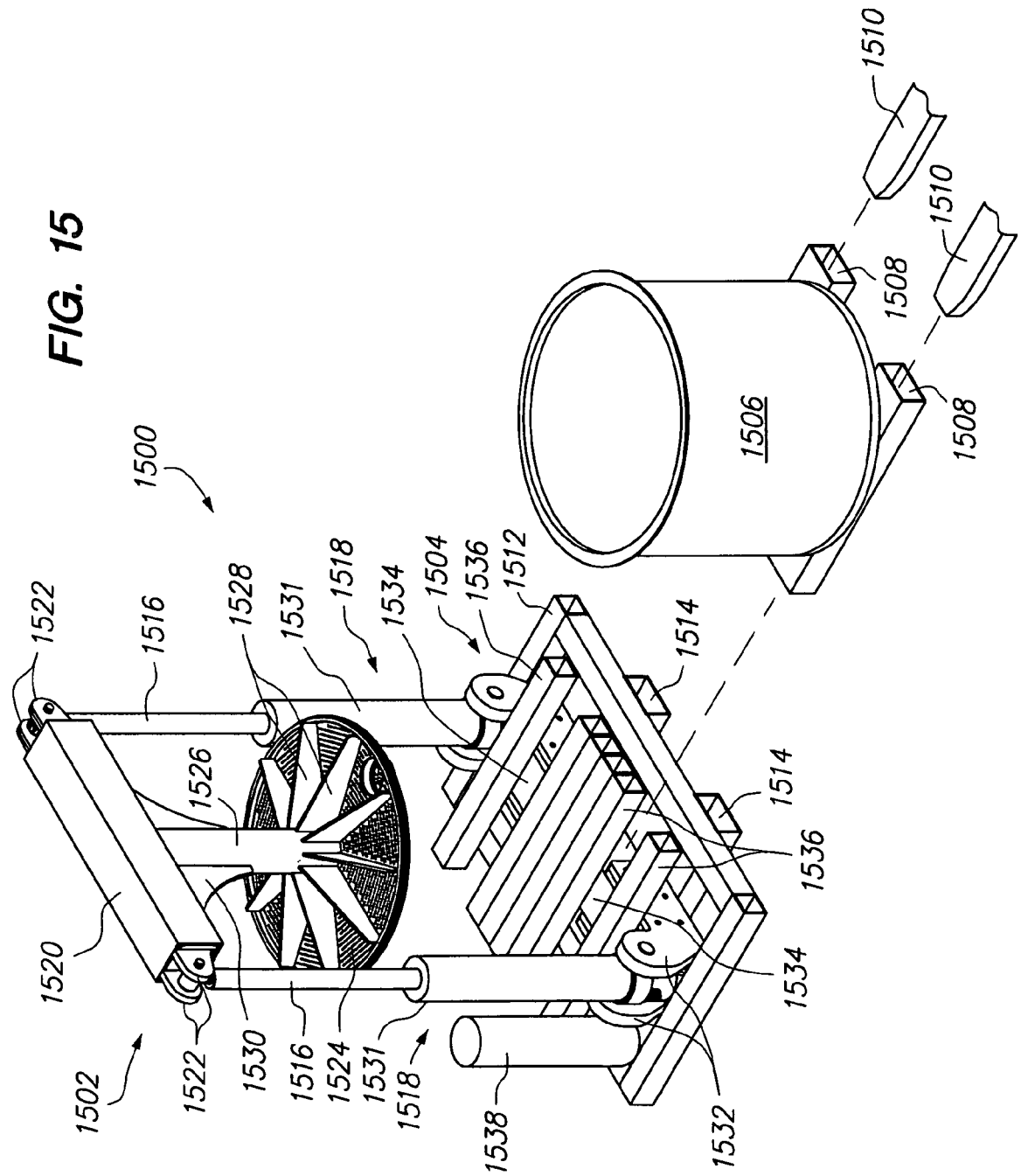
FIG. 15 is a perspective view of yet another embodiment of the invention, showing a tank removed from the press mechanism.

FIG. 15 is a perspective view of yet another embodiment of the present inventive wine press mechanism 1500. The wine press mechanism 1500 is similar to the previously described embodiments of the invention in many respects. The wine press mechanism 1500 has a fixed frame 1502 and a lifting platform 1503 for lifting an alternate tank 1506. The tank 1506 is used much as has been described previously herein.

That is, as with the other embodiments of the invention, fermentation can take place in the tank, before, after and/or between pressing processes within the tank 1506, and the like. In this described embodiment, the tank 1506 has a pair of fork lift receiving tubes 1508 affixed to the bottom thereof, for accepting the lifting arms 1510 of a forklift (not shown) such that the tank 1506 can readily be lifted by the forklift lifting arms 1510 and be placed into or removed from the wine press mechanism 1500.

The fixed frame 1502 of the wine press mechanism has a base frame 1512 with a pair of support skids 1514 thereunder. The support skids 1514 are sized and spaced such that they will accept the fork lift lifting arms 1510 so that the entire wine press mechanism 1500 can easily be moved by forklift as required. The fixed frame 1502 also has a pair of upright support tubes 1516 which are the stationary portion of a pair of hydraulic lifts 1518. The upright tubes 1516 support a top member 1520, as can be seen in the view of FIG. 15. The top member 1520 is affixed to the upright tubes 1516 by four top member attachment plates 1522, and the upright tubes 1516 are affixed to the base assembly 1512 by means which will be discussed in more detail hereinafter.

The embodiment of the invention shown in FIG. 15 has a press plate 1524 of the same general construction as the press plate 302 discussed previously herein. The press plate 1524 has the same sort of apertures for letting fluids there through as does the press plate 302. The press plate 1524 has a riser tube 1526 which is a structural member and which generally rigidly attaches the press plate 1524 relative to the top member. In the described embodiment, the riser tube 1526 extends slightly below the press plate 1524 (about 2 inches below in this example). In addition to being a structural member in this embodiment, the riser tube 1526 performs most of the functions of the bypass tube 502 discussed previously herein, in that tubes can be inserted through the riser tube 1526 and on through the press plate 1524 to remove fluids from the tank 1506. As can also be seen in the view of FIG. 15, the press plate 1524 has a plurality (ten, in this example) of structural vanes 1528 for providing additional rigidity to the press plate 1524. A tube support web 1530 is provided to add additional strength and rigidity to the riser tube 1526.

The lifting platform 1504 portion of the wine press mechanism 1500 has a pair of moving cylinders 1531, which are the moving portions of the hydraulic lifts 1518. Four moving cylinder attachment brackets 1532 are connected (pinned, in this example) to the moving cylinders 1531, as shown in the view of FIG. 15. A moving cross member 1532 is bolted at to the moving cylinder attachment brackets 1532 such that the moving cross member 1532 connects the moving cylinder attachment brackets 1532 and provides a strong support member that will support the weight of the tank 1506 and contents, as will be discussed in more detail hereinafter. A plurality of platform tubes are positioned and rigidly affixed across the moving cross member 1534 to form a platform on which the tank 1506 can rest. The platform tubes 1536 are spaced to accept the fork lift receiving tubes 1508 there between.

A hydraulic pump 1538 has a generally cylindrical housing in this embodiment. In the view of FIG. 15, the hydraulic pump 1538 is depicted as a simple cylinder. Details of the hydraulic system are omitted from the view of FIG. 15 for the sake of clarity, and will be discussed in more detail hereinafter.

Figure 16:
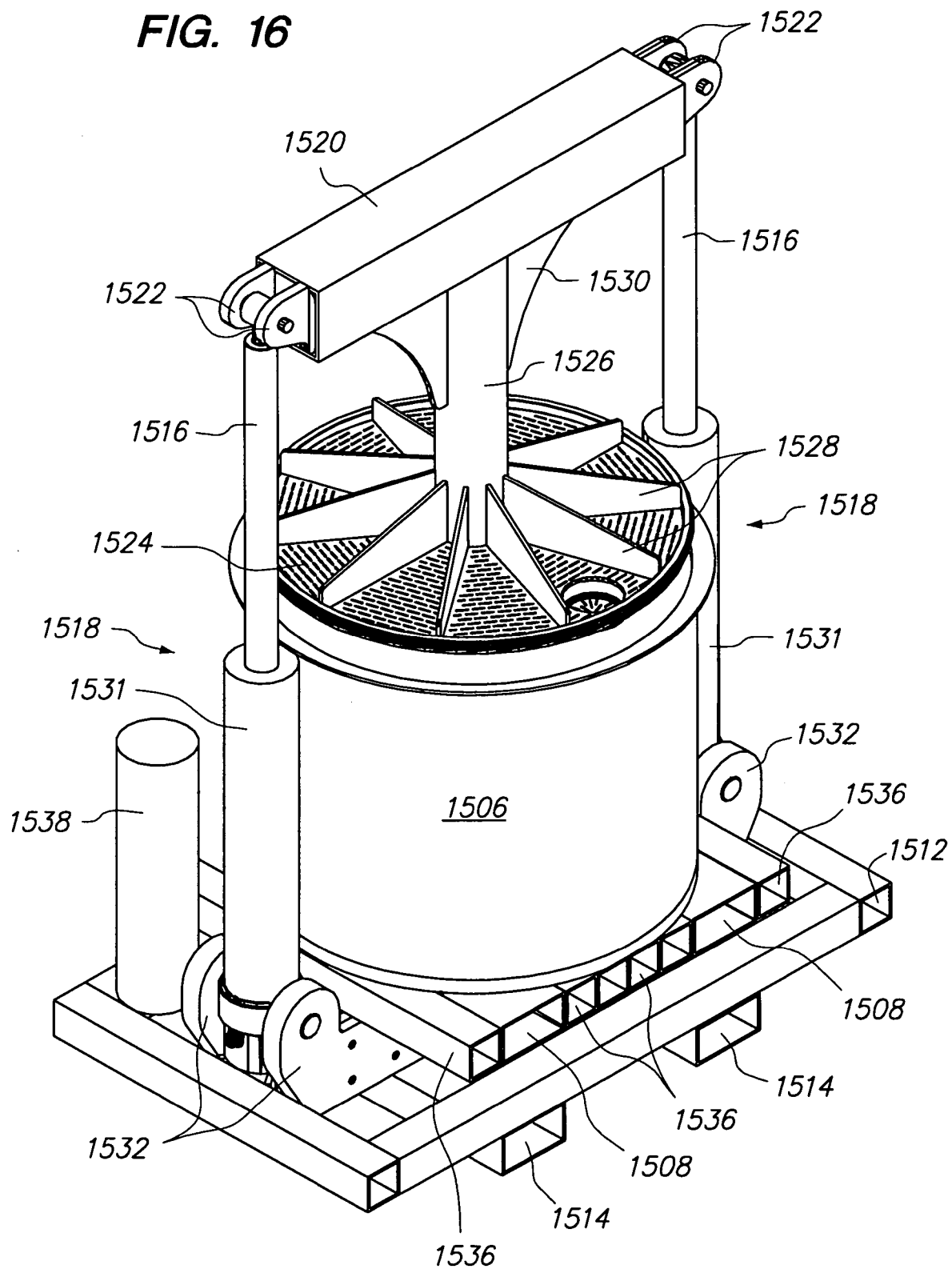
FIG. 16 is a perspective view, similar to the view of FIG. 15, showing the tank inserted in the press mechanism.

FIG. 16 is a perspective view, similar to the view of FIG. 15, showing the tank 1506 placed on the platform tubes 1536 of the wine press mechanism 1500. As previously discussed herein, the fork lift receiving tubes 1508 fit closely between the platform tubes 1536 such that all of the platform tubes 1536 and the fork lift receiving tubes 1508 rest on the moving cross member 1534 (FIG. 1) and form a generally complete platform under the tank 1506. As can be appreciated by comparison of FIGS. 15 and 16, in this presently described embodiment of the invention, the tank 1506 can be moved straight into the wine press mechanism 1500 and positioned thereon. That is, there are no obstructions over or around which the tank 1506 must be maneuvered. One advantage is that a forklift can be used to position the tank 1506 on the wine press mechanism 1500, which is generally easier, quicker, and safer than using a crane, overhead lifting mechanism, or the like.

Figure 17:
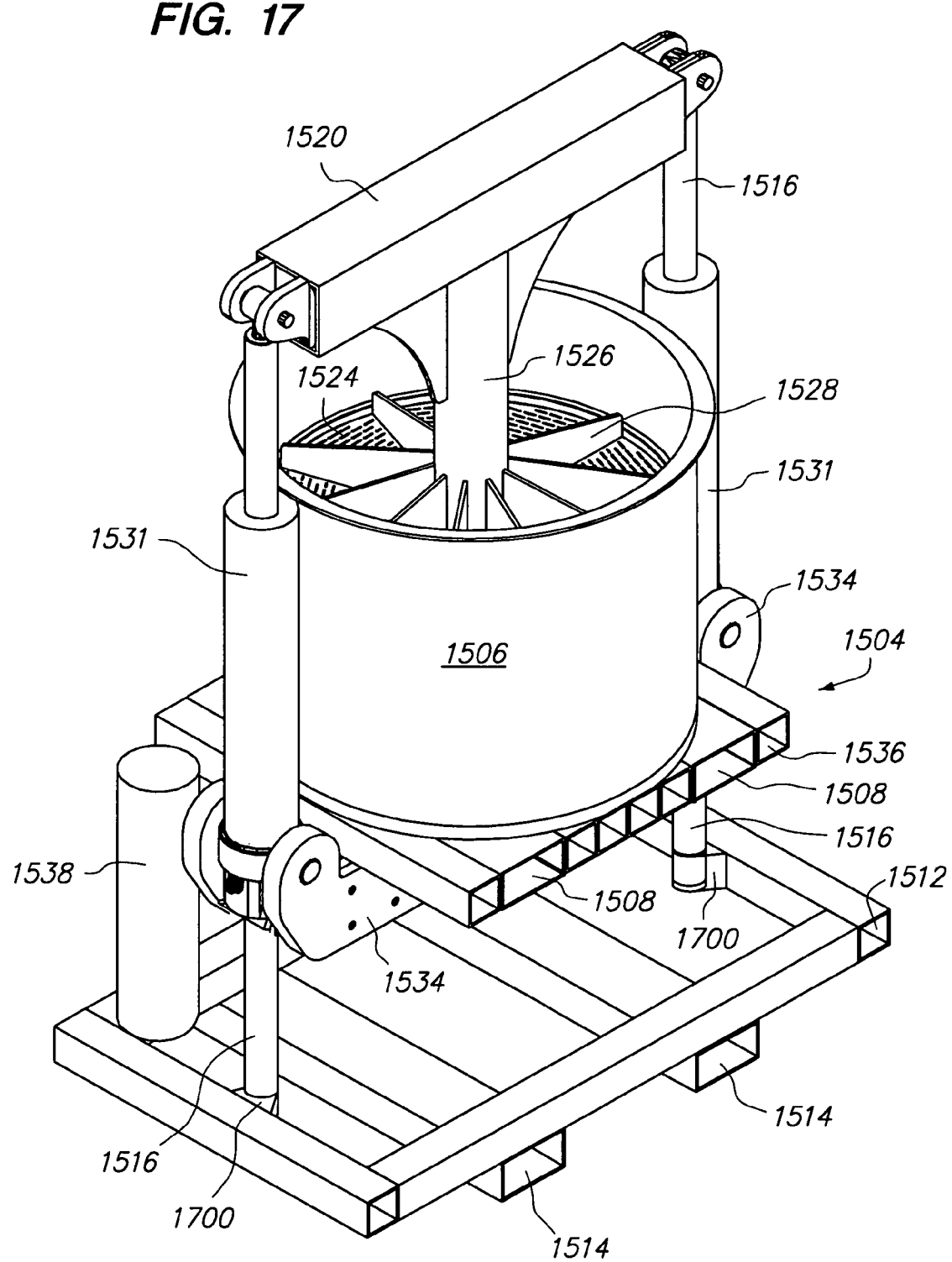
FIG. 17 is a perspective view, similar to the views of FIGS. 15 and 16, showing the tank in a raised position within the press mechanism.

FIG. 17 is a perspective view, similar to the view of FIGS. 15 and 16, showing the tank 1506 raised within the wine press mechanism 1500 such that the contents of the tank 1506 (were there any) would be crushed between the interior of the tank 1506 and the press plate 1524. As can be seen by a comparison of FIGS. 16 and 17, the tank 1506 is raised by the action of the moving cylinders 1532 moving upward (under hydraulic pressure) along the upright support tubes 1516. The entire lifting platform 1504, including the moving cylinder attachment brackets 1532, the moving cross member 1534, and the platform tubes, is raised with the moving cylinders 1532, thereby raising the tank 1506 which is placed thereon. In the view of FIG. 17 can also be seen a pair of lower tube brackets 1700 which receive the upright support tubes 1516 and affix them to the base frame 1512.

FIG. 18 is a block diagrammatic representation of a hydraulic system 1800 such as is used in the example of the embodiment of the invention shown and described in relation to FIGS. 15, 16 and 17. As previously discussed herein, details of the hydraulic system 1800 were omitted from the views of FIGS. 15, 6 and 17 for the sake of clarity. The hydraulic system 1800 has a fluid reservoir 1802, and a valve 1804 for controlling the flow of fluid in the hydraulic system 1800. The valve 1804 in this example is a solenoid valve which can be controlled electrically, although that is not a necessary aspect of the invention. The valve 1804 is of the type which will allow fluid flow in both directions so that the tank 1506 (FIG. 15) can be both raised and lowered. One skilled in the art will recognize that there are several types of valve arrangements which will allow for such two way fluid flow, and one skilled in the art could readily construct such a valve arrangement. The simplified example of FIG. 18 is intended only to depict one example which is sufficient to illustrate the particular embodiment presently being discussed. According to the example of the invention presently being described, a first dual ram lift 1518*a* is of a "double rodded" type of ram. That is, when the first dual ram lift 1518 receives fluid and is moved thereby, it forces an equal amount of fluid out of the other end thereof. As can be seen in the view of FIG. 18, when fluid is introduced into the first dual ram lift 1518*a* through hydraulic lines 1806, then a like amount of fluid will be introduced into a second lift 1518*b*. This is referred to in the industry as connecting the ram lifts 1518*a* and 1518*b* "in series". An advantage of this arrangement is that it insures that the hydraulic lifts 1518 (FIG. 17) will lift the tank 1506 evenly, even if there might be a difference in back pressure between the two hydraulic ram lifts 1518*a* and 1518*b*. Therefore, no additional level monitoring apparatus or differential leveling control apparatus is required according to this presently described embodiment.

As can be seen in light of the discussion of the embodiment of the wine press mechanism 1500 discussed herein in relation to FIGS. 15 through 18, the wine press mechanism 1500 is quite simple and easy to use. There are no obstructions to prevent the tank 1506 from being moved straight into the wine press mechanism 1500. The press plate 1524 need not be removed to either insert the tank 1504 into the wine press mechanism 1500 or to remove it therefrom. No electronic or manual leveling mechanism is required, and both the tank 1504 and the entire wine press mechanism 1500 can easily be moved and positioned using a forklift.

The description of particular embodiments of the invention is now complete. Many of the described features of the invention may be substituted, altered or omitted without departing from the scope of the invention. For example, wheels 144(1-4) can be replaced with rubber blocks, and apparatus 100 can be moved by a hoist, lift-truck, crane, or the like. As another example, the engaging mechanism (i.e., tray 113) can be replaced with an alternate engaging mechanism (e.g., a clamp adapted to engage the upper lip of tank 102, or a stationary platform adapted to support tank 102) fixed to the first portion 108 of frame 106, and first portion 108 and second portion 110 of frame 106 would be movably mounted to one another. Then, power cylinders 122(1-4) could be coupled between first and second portions 108 and 110 of frame 106, to drive press plate 302 into tank 102. These and other deviations from the particular embodiments shown will be apparent to those skilled in the art, particularly in view of the foregoing disclosure.

I claim:

1. A wine pressing apparatus, comprising:
   an engaging mechanism adapted to engage a tank; and
   a press mechanism coupled to said engaging mechanism for pressing contents of said tank against an inner surface of said tank; and wherein
   said press mechanism includes
      a perforated press plate for placement within said tank, whereby said contents of said tank can be pressed between said press plate and said inner surface of said tank, and
      a frame for receiving said tank and for supporting said press plate within said tank;
   said frame includes
      a first portion including a plurality of legs and being coupled to said engaging mechanism, and
      a second portion detachably engaging said first portion, said press plate being coupled to said second portion; and
   said second portion of said frame includes
      a body,
      a first plurality of legs coupled to said body for engaging said plurality of legs of said first portion of said frame, and
      a second plurality of legs, each of said second plurality of legs having a first end coupled to said body and a second end coupled to said press plate.

2. The wine pressing apparatus according to claim 1, wherein the press plate includes a plurality of apertures distributed over a majority of a pressing surface of the press plate.

3. A wine pressing apparatus according to claim 1, wherein said press plate further defines a bypass opening for receiving a bypass device.

4. A wine pressing apparatus according to claim 3, wherein said bypass device comprises a bypass tube disposed in said bypass opening to facilitate the flow of said wine past said press plate.

5. A wine pressing apparatus according to claim 4, wherein a wall of said bypass tube includes a plurality of apertures to facilitate the flow of wine through said wall of said bypass tube while keeping solid material out of said bypass tube.

6. A wine pressing apparatus according to claim 5, wherein:
   the wall of said bypass tube includes a solid section at each end; and
   the wall of said bypass tube defines said plurality of apertures between said solid sections.

7. A wine pressing apparatus according to claim 4, wherein said bypass tube can slide within said bypass opening.

8. A wine pressing apparatus according to claim 7, wherein said bypass tube further includes at least one retaining device to retain said bypass tube within said bypass opening.

9. A wine pressing apparatus according to claim 1, wherein at least one of said plurality of legs of said first portion of said frame is shorter than at least one other of said plurality of legs of said first portion of said frame, to facilitate inserting said tank in said frame.

10. A wine pressing apparatus according to claim 1, wherein:
    said body of said second portion of said frame includes a cross-frame;
    said first plurality of legs of said second portion of said frame extend perpendicularly from said cross-frame at positions beyond the perimeter of said tank; and
    said second plurality of legs of said second portion of said frame extend perpendicularly from said cross-frame at positions within the perimeter of said tank.

11. A wine pressing apparatus according to claim 1, further comprising at least one drive mechanism for moving said engaging mechanism with respect to said second portion of said frame.

12. A wine pressing apparatus according to claim 11, wherein:
    said first portion is held in a fixed position with respect to said second portion;
    said engaging mechanism includes a tray for receiving said tank; and
    said drive mechanism includes at least one lifting mechanism adapted to lift said tray with respect to said first portion of said frame.

13. A wine pressing apparatus according to claim 12, wherein said drive mechanism includes a plurality of lifting mechanisms.

14. A wine pressing apparatus according to claim 13, wherein said plurality of lifting mechanisms are arranged around the perimeter of said tray.

15. A wine pressing apparatus according to claim 13, further comprising:
    a leveling sensor fixed to said tray; and
    a control system responsive to a signal from said leveling sensor, and operative to drive each of said lifting mechanisms to maintain said tray in a level position during a pressing operation.

16. A wine pressing apparatus according to claim 1, further including:
    at least one drive mechanism and wherein
    said first portion of said frame is held stationary with respect to said tank;
    said first portion of said frame is movably coupled to said second portion of said frame; and
    said drive mechanism moves said second portion of said frame with respect to said first portion of said frame.

17. A wine pressing apparatus according to claim 16, further including a plurality of independently controllable drive mechanisms.

18. A wine pressing apparatus according to claim 11, wherein said drive mechanism comprises at least one powered cylinder.

19. A wine pressing apparatus according to claim 18, wherein said drive mechanism comprises at least one double-acting hydraulic cylinder.

20. A wine pressing apparatus according to claim 1, further including an alignment mechanism for aligning said tank with respect to said press mechanism.

21. A wine pressing apparatus according to claim 20, wherein:
said engaging mechanism includes a tray for receiving said tank; and
said aligning mechanism includes a plurality of concentric recesses formed in the bottom of said tray to receive tanks of varying sizes in a centered position with respect to said press plate.

22. A wine pressing apparatus according to claim 21, wherein said concentric recesses comprise a plurality of concentric rings fixed to the base of said tray.

23. A wine pressing apparatus according to claim 22, wherein each of said concentric rings are selectively removable from said tray.

24. A wine pressing apparatus according to claim 20, wherein:
said plurality of legs of said first portion of said frame extend upward; and
said alignment mechanism comprises a plurality of alignment blocks each mounted to a respective one of said upwardly extending legs, to align said tank within said frame.

25. A wine pressing apparatus according to claim 24, wherein each of said alignment blocks has a tapered upper end to guide said tank into alignment as said tank is lowered into said frame.

26. A wine pressing apparatus according to claim 1, further comprising a plurality of wheels fixed to said frame for transporting said wine pressing apparatus.

27. A wine pressing apparatus according to claim 1, wherein said frame further includes a plurality of guideways for receiving the forks of a lift truck.

28. A wine pressing apparatus according to claim 1, further comprising said tank, and wherein the inner surface of said tank is substantially continuous.

29. A wine pressing apparatus, comprising:
an engaging mechanism adapted to engage a tank; and
a press mechanism coupled to said engaging mechanism for pressing contents of said tank against an inner surface of said tank; and wherein
said press mechanism includes
a perforated press plate for placement within said tank, whereby said contents of said tank can be pressed between said press plate and said inner surface of said tank, and
a frame for receiving said tank and for supporting said press plate within said tank;
said frame includes
a first portion coupled to said engaging mechanism, and
a second portion detachably engaging said first portion, said press plate being coupled to said second portion; and
said second portion of said frame includes
a cross-frame,
a first plurality of legs extending perpendicularly from said cross-frame at positions beyond the perimeter of said tank for engaging said first portion of said frame, and
a second plurality of legs extending perpendicularly from said cross-frame at positions within the perimeter of said tank for engaging said press plate.

30. The wine pressing apparatus according to claim 29, wherein the press plate includes a plurality of apertures distributed over a majority of a pressing surface of the press plate.

31. A wine pressing apparatus according to claim 29, wherein said press plate further defines a bypass opening for receiving a bypass device.

32. A wine pressing apparatus according to claim 31, wherein said bypass device comprises a bypass tube disposed in said bypass opening to facilitate the flow of said wine past said press plate.

33. A wine pressing apparatus according to claim 32, wherein a wall of said bypass tube includes a plurality of apertures to facilitate the flow of wine through said wall of said bypass tube while keeping solid material out of said bypass tube.

34. A wine pressing apparatus according to claim 33, wherein:
the wall of said bypass tube includes a solid section at each end; and
the wall of said bypass tube defines said plurality of apertures between said solid sections.

35. A wine pressing apparatus according to claim 32, wherein said bypass tube can slide within said bypass opening.

36. A wine pressing apparatus according to claim 35, wherein said bypass tube further includes at least one retaining device to retain said bypass tube within said bypass opening.

37. A wine pressing apparatus according to claim 29, wherein:
said first portion of said frame includes a plurality of legs; and
at least one of said plurality of legs of said first portion of said frame is shorter than at least one other of said plurality of legs of said first portion of said frame, to facilitate inserting said tank in said frame.

38. A wine pressing apparatus according to claim 29, further comprising at least one drive mechanism for moving said engaging mechanism with respect to said second portion of said frame.

39. A wine pressing apparatus according to claim 38, wherein:
said first portion is held in a fixed position with respect to said second portion;
said engaging mechanism includes a tray for receiving said tank; and
said drive mechanism includes at least one lifting mechanism adapted to lift said tray with respect to said first portion of said frame.

40. A wine pressing apparatus according to claim 39, wherein said drive mechanism includes a plurality of lifting mechanisms.

41. A wine pressing apparatus according to claim 40, wherein said plurality of lifting mechanisms are arranged around the perimeter of said tray.

42. A wine pressing apparatus according to claim 40, further comprising:
a leveling sensor fixed to said tray; and
a control system responsive to a signal from said leveling sensor, and operative to drive each of said lifting mechanisms to maintain said tray in a level position during a pressing operation.

43. A wine pressing apparatus according to claim 38, wherein said drive mechanism comprises at least one powered cylinder.

44. A wine pressing apparatus according to claim 43, wherein said drive mechanism comprises at least one double-acting hydraulic cylinder.

45. A wine pressing apparatus according to claim 29, further comprising:
at least one drive mechanism; and wherein
said first portion of said frame is held stationary with respect to said tank;
said first portion of said frame is movably coupled to said second portion of said frame; and
said drive mechanism moves said second portion of said frame with respect to said first portion of said frame.

46. A wine pressing apparatus according to claim 45, further including a plurality of independently controllable drive mechanisms.

47. A wine pressing apparatus according to claim 29, further including an alignment mechanism for aligning said tank with respect to said press mechanism.

48. A wine pressing apparatus according to claim 47, wherein:
said engaging mechanism includes a tray for receiving said tank; and
said aligning mechanism includes a plurality of concentric recesses formed in the bottom of said tray to receive tanks of varying sizes in a centered position with respect to said press plate.

49. A wine pressing apparatus according to claim 48, wherein said concentric recesses comprise a plurality of concentric rings fixed to the base of said tray.

50. A wine pressing apparatus according to claim 49, wherein each of said concentric rings are selectively removable from said tray.

51. A wine pressing apparatus according to claim 47, wherein:
said first portion of said frame includes a plurality of upwardly extending legs; and
said alignment mechanism comprises a plurality of alignment blocks each mounted to a respective one of said upwardly extending legs, to align said tank within said frame.

52. A wine pressing apparatus according to claim 51, wherein each of said alignment blocks has a tapered upper end to guide said tank into alignment as said tank is lowered into said frame.

53. A wine pressing apparatus according to claim 29, further comprising a plurality of wheels fixed to said frame for transporting said wine pressing apparatus.

54. A wine pressing apparatus according to claim 29, wherein said frame further includes a plurality of guideways for receiving the forks of a lift truck.

55. A wine pressing apparatus according to claim 29, further comprising said tank, and wherein the inner surface of said tank is substantially continuous.

56. A wine pressing apparatus, comprising:
an engaging mechanism including a tray for receiving said tank;
a press mechanism coupled to said engaging mechanism for pressing contents of said tank against an inner surface of said tank;
at least one drive mechanism;
a leveling sensor fixed to said tray; and
a control system; and wherein
said press mechanism includes
a perforated press plate for placement within said tank, whereby said contents of said tank can be pressed between said press plate and said inner surface of said tank, and
a frame for receiving said tank and for supporting said press plate within said tank;
said frame includes
a first portion coupled to said engaging mechanism, and
a second portion detachably engaging said first portion, said press plate being coupled to said second portion;
said drive mechanism moves said engaging mechanism with respect to said second portion of said frame;
said first portion of said frame is held in a fixed position with respect to said second portion of said frame;
said drive mechanism includes a plurality of lifting mechanism adapted to lift said tray with respect to said first portion of said frame; and
said control system, responsive to a signal from said leveling sensor, is operative to drive each of said lifting mechanisms to maintain said tray in a level position during a pressing operation.

57. The wine pressing apparatus according to claim 56, wherein the press plate includes a plurality of apertures distributed over a majority of a pressing surface of the press plate.

58. A wine pressing apparatus according to claim 56, wherein said press plate further defines a bypass opening for receiving a bypass device.

59. A wine pressing apparatus according to claim 58, wherein said bypass device comprises a bypass tube disposed in said bypass opening to facilitate the flow of said wine past said press plate.

60. A wine pressing apparatus according to claim 59, wherein a wall of said bypass tube includes a plurality of apertures to facilitate the flow of wine through said wall of said bypass tube while keeping solid material out of said bypass tube.

61. A wine pressing apparatus according to claim 60, wherein:
the wall of said bypass tube includes a solid section at each end; and
the wall of said bypass tube defines said plurality of apertures between said solid sections.

62. A wine pressing apparatus according to claim 59, wherein said bypass tube can slide within said bypass opening.

63. A wine pressing apparatus according to claim 62, wherein said bypass tube further includes at least one retaining device to retain said bypass tube within said bypass opening.

64. A wine pressing apparatus according to claim 56, wherein:
said first portion of said frame includes a plurality of legs;
said second portion of said frame includes a body, a first plurality of legs coupled to said body for engaging said plurality of legs of said first portion of said frame, and a second plurality of legs, each of said second plurality of legs having a first end coupled to said body and a second end coupled to said press plate; and
at least one of said plurality of legs of said first portion of said frame is shorter than at least one other of said plurality of legs of said first portion of said frame, to facilitate inserting said tank in said frame.

65. A wine pressing apparatus according to claim 56, wherein said second portion of said frame comprises:
a cross-frame;
a first plurality of legs extending perpendicularly from said cross-frame at positions beyond the perimeter of said tank for engaging said first portion of said frame; and a second plurality of legs extending perpendicularly from said cross-frame at positions within the perimeter of said tank for engaging said press plate.

66. A wine pressing apparatus according to claim 56, wherein said plurality of lifting mechanisms are arranged around the perimeter of said tray.

67. A wine pressing apparatus according to claim 56, wherein each of said lifting mechanisms is independently controllable.

68. A wine pressing apparatus according to claim 56, wherein each of said lifting mechanisms comprises at least one powered cylinder.

69. A wine pressing apparatus according to claim 68, wherein each of said lifting mechanisms comprises at least one double-acting hydraulic cylinder.

70. A wine pressing apparatus according to claim 56, further including an alignment mechanism for aligning said tank with respect to said press mechanism.

71. A wine pressing apparatus according to claim 70, wherein said aligning mechanism includes a plurality of concentric recesses formed in the bottom of said tray to receive tanks of varying sizes in a centered position with respect to said press plate.

72. A wine pressing apparatus according to claim 71, wherein said concentric recesses comprise a plurality of concentric rings fixed to the base of said tray.

73. A wine pressing apparatus according to claim 72, wherein each of said concentric rings are selectively removable from said tray.

74. A wine pressing apparatus according to claim 70, wherein:
said first portion of said frame includes a plurality of upwardly extending legs; and
said alignment mechanism comprises a plurality of alignment blocks each mounted to a respective one of said upwardly extending legs, to align said tank within said frame.

75. A wine pressing apparatus according to claim 74, wherein each of said alignment blocks has a tapered upper end to guide said tank into alignment as said tank is lowered into said frame.

76. A wine pressing apparatus according to claim 56, further comprising a plurality of wheels fixed to said frame for transporting said wine pressing apparatus.

77. A wine pressing apparatus according to claim 56, wherein said frame further includes a plurality of guideways for receiving the forks of a lift truck.

78. A wine pressing apparatus according to claim 56, further comprising said tank, and wherein the inner surface of said tank is substantially continuous.

79. A wine pressing apparatus, comprising:
an engaging mechanism adapted to engage a tank;
a press mechanism coupled to said engaging mechanism for pressing contents of said tank against an inner surface of said tank; and
at least one drive mechanism; and wherein
said press mechanism includes
a perforated press plate for placement within said tank, whereby said contents of said tank can be pressed between said press plate and said inner surface of said tank, and
a frame for receiving said tank and for supporting said press plate within said tank;
said frame includes
a first portion coupled to said engaging mechanism, and
a second portion detachably engaging said first portion, said press plate being coupled to said second portion;
said first portion of said frame is held stationary with respect to said tank;
said first portion of said frame is movably coupled to said second portion of said frame; and
said drive mechanism moves said second portion of said frame with respect to said first portion of said frame.

80. The wine pressing apparatus according to claim 79, wherein the press plate includes a plurality of apertures distributed over a majority of a pressing surface of the press plate.

81. A wine pressing apparatus according to claim 79, wherein said press plate further defines a bypass opening for receiving a bypass device.

82. A wine pressing apparatus according to claim 81, wherein said bypass device comprises a bypass tube disposed in said bypass opening to facilitate the flow of said wine past said press plate.

83. A wine pressing apparatus according to claim 82, wherein a wall of said bypass tube includes a plurality of apertures to facilitate the flow of wine through said wall of said bypass tube while keeping solid material out of said bypass tube.

84. A wine pressing apparatus according to claim 83, wherein:
the wall of said bypass tube includes a solid section at each end; and
the wall of said bypass tube defines said plurality of apertures between said solid sections.

85. A wine pressing apparatus according to claim 82, wherein said bypass tube can slide within said bypass opening.

86. A wine pressing apparatus according to claim 85, wherein said bypass tube further includes at least one retaining device to retain said bypass tube within said bypass opening.

87. A wine pressing apparatus according to claim 79, wherein:
said first portion of said frame includes a plurality of legs;
said second portion of said frame includes a body, a first plurality of legs coupled to said body for engaging said plurality of legs of said first portion of said frame, and a second plurality of legs, each of said second plurality of legs having a first end coupled to said body and a second end coupled to said press plate; and
at least one of said plurality of legs of said first portion of said frame is shorter than at least one other of said plurality of legs of said first portion of said frame, to facilitate inserting said tank in said frame.

88. A wine pressing apparatus according to claim 79, further including a plurality of independently controllable drive mechanisms.

89. A wine pressing apparatus according to claim 79, wherein said drive mechanism comprises at least one powered cylinder.

90. A wine pressing apparatus according to claim 89, wherein said drive mechanism comprises at least one double-acting hydraulic cylinder.

91. A wine pressing apparatus according to claim 79, further including an alignment mechanism for aligning said tank with respect to said press mechanism.

92. A wine pressing apparatus according to claim 91, wherein:
said engaging mechanism includes a tray for receiving said tank; and said aligning mechanism includes a plurality of concentric recesses formed in the bottom of said tray to receive tanks of varying sizes in a centered position with respect to said press plate.

93. A wine pressing apparatus according to claim 92, wherein said concentric recesses comprise a plurality of concentric rings fixed to the base of said tray.

94. A wine pressing apparatus according to claim 93, wherein each of said concentric rings are selectively removable from said tray.

95. A wine pressing apparatus according to claim 91, wherein:
    said first portion of said frame includes a plurality of upwardly extending legs; and
    said alignment mechanism comprises a plurality of alignment blocks each mounted to a respective one of said upwardly extending legs, to align said tank within said frame.

96. A wine pressing apparatus according to claim 95, wherein each of said alignment blocks has a tapered upper end to guide said tank into alignment as said tank is lowered into said frame.

97. A wine pressing apparatus according to claim 79, further comprising a plurality of wheels fixed to said frame for transporting said wine pressing apparatus.

98. A wine pressing apparatus according to claim 79, wherein said frame further includes a plurality of guideways for receiving the forks of a lift truck.

99. A wine pressing apparatus according to claim 79, further comprising said tank, and wherein the inner surface of said tank is substantially continuous.

100. A wine pressing apparatus, comprising:
    an engaging mechanism including a tray for receiving a tank;
    a press mechanism coupled to said engaging mechanism for pressing contents of said tank against an inner surface of said tank; and
    an alignment mechanism for aligning said tank with respect to said press mechanism; and wherein
    said press mechanism includes
        a perforated press plate for placement within said tank, whereby said contents of said tank can be pressed between said press plate and said inner surface of said tank, and
        a frame for receiving said tank and for supporting said press plate within said tank;
    said frame includes
        a first portion coupled to said engaging mechanism, and
        a second portion detachably engaging said first portion, said press plate being coupled to said second portion; and
    said aligning mechanism includes a plurality of concentric recesses formed in the bottom of said tray to receive tanks of varying sizes in a centered position with respect to said press plate.

101. The wine pressing apparatus according to claim 100, wherein the press plate includes a plurality of apertures distributed over a majority of a pressing surface of the press plate.

102. A wine pressing apparatus according to claim 100, wherein said press plate further defines a bypass opening for receiving a bypass device.

103. A wine pressing apparatus according to claim 102, wherein said bypass device comprises a bypass tube disposed in said bypass opening to facilitate the flow of said wine past said press plate.

104. A wine pressing apparatus according to claim 103, wherein a wall of said bypass tube includes a plurality of apertures to facilitate the flow of wine through said wall of said bypass tube while keeping solid material out of said bypass tube.

105. A wine pressing apparatus according to claim 104, wherein:
    the wall of said bypass tube includes a solid section at each end; and
    the wall of said bypass tube defines said plurality of apertures between said solid sections.

106. A wine pressing apparatus according to claim 103, wherein said bypass tube can slide within said bypass opening.

107. A wine pressing apparatus according to claim 106, wherein said bypass tube further includes at least one retaining device to retain said bypass tube within said bypass opening.

108. A wine pressing apparatus according to claim 100, wherein:
    said first portion of said frame includes a plurality of legs;
    said second portion of said frame includes a body, a first plurality of legs coupled to said body for engaging said plurality of legs of said first portion of said frame, and a second plurality of legs, each of said second plurality of legs having a first end coupled to said body and a second end coupled to said press plate; and
    at least one of said plurality of legs of said first portion of said frame is shorter than at least one other of said plurality of legs of said first portion of said frame, to facilitate inserting said tank in said frame.

109. A wine pressing apparatus according to claim 100, further comprising at least one drive mechanism for moving said engaging mechanism with respect to said second portion of said frame.

110. A wine pressing apparatus according to claim 109, wherein:
    said first portion is held in a fixed position with respect to said second portion; and
    said drive mechanism includes at least one lifting mechanism adapted to lift said tray with respect to said first portion of said frame.

111. A wine pressing apparatus according to claim 110, wherein said drive mechanism includes a plurality of lifting mechanisms.

112. A wine pressing apparatus according to claim 111, wherein said plurality of lifting mechanisms are arranged around the perimeter of said tray.

113. A wine pressing apparatus according to claim 109, wherein said drive mechanism comprises at least one powered cylinder.

114. A wine pressing apparatus according to claim 113, wherein said drive mechanism comprises at least one double-acting hydraulic cylinder.

115. A wine pressing apparatus according to claim 100, further comprising:
    a plurality of independently controllable drive mechanisms; and wherein
    said first portion of said frame is held stationary with respect to said tank;
    said first portion of said frame is movably coupled to said second portion of said frame; and
    said plurality of drive mechanisms moves said second portion of said frame with respect to said first portion of said frame.

116. A wine pressing apparatus according to claim 100, wherein said concentric recesses comprise a plurality of concentric rings fixed to the base of said tray.

117. A wine pressing apparatus according to claim 116, wherein each of said concentric rings are selectively removable from said tray.

118. A wine pressing apparatus according to claim 100, wherein:
said first portion of said frame includes a plurality of upwardly extending legs; and
said alignment mechanism comprises a plurality of alignment blocks each mounted to a respective one of said upwardly extending legs, to align said tank within said frame.

119. A wine pressing apparatus according to claim 118, wherein each of said alignment blocks has a tapered upper end to guide said tank into alignment as said tank is lowered into said frame.

120. A wine pressing apparatus according to claim 100, further comprising a plurality of wheels fixed to said frame for transporting said wine pressing apparatus.

121. A wine pressing apparatus according to claim 100, wherein said frame further includes a plurality of guideways for receiving the forks of a lift truck.

122. A wine pressing apparatus according to claim 100, further comprising said tank, and wherein the inner surface of said tank is substantially continuous.

123. A wine pressing apparatus, comprising:
an engaging mechanism adapted to engage a tank;
a press mechanism coupled to said engaging mechanism for pressing contents of said tank against an inner surface of said tank; and
an alignment mechanism for aligning said tank with respect to said press mechanism; and wherein
said press mechanism includes
a perforated press plate for placement within said tank, whereby said contents of said tank can be pressed between said press plate and said inner surface of said tank, and
a frame for receiving said tank and for supporting said press plate within said tank;
said frame includes
a first portion coupled to said engaging mechanism, and
a second portion detachably engaging said first portion, said press plate being coupled to said second portion;
said first portion of said frame includes a plurality of upwardly extending legs; and
said alignment mechanism comprises a plurality of alignment blocks each mounted to a respective one of said upwardly extending legs, to align said tank within said frame.

124. The wine pressing apparatus according to claim 123, wherein the press plate includes a plurality of apertures distributed over a majority of a pressing surface of the press plate.

125. A wine pressing apparatus according to claim 123, wherein said press plate further defines a bypass opening for receiving a bypass device.

126. A wine pressing apparatus according to claim 125, wherein said bypass device comprises a bypass tube disposed in said bypass opening to facilitate the flow of said wine past said press plate.

127. A wine pressing apparatus according to claim 126, wherein a wall of said bypass tube includes a plurality of apertures to facilitate the flow of wine through said wall of said bypass tube while keeping solid material out of said bypass tube.

128. A wine pressing apparatus according to claim 127, wherein:
the wall of said bypass tube includes a solid section at each end; and
the wall of said bypass tube defines said plurality of apertures between said solid sections.

129. A wine pressing apparatus according to claim 126, wherein said bypass tube can slide within said bypass opening.

130. A wine pressing apparatus according to claim 129, wherein said bypass tube further includes at least one retaining device to retain said bypass tube within said bypass opening.

131. A wine pressing apparatus according to claim 123, wherein:
said second portion of said frame includes a body, a first plurality of legs coupled to said body for engaging said plurality of legs of said first portion of said frame, and a second plurality of legs, each of said second plurality of legs having a first end coupled to said body and a second end coupled to said press plate; and
at least one of said plurality of legs of said first portion of said frame is shorter than at least one other of said plurality of legs of said first portion of said frame, to facilitate inserting said tank in said frame.

132. A wine pressing apparatus according to claim 123, further comprising at least one drive mechanism for moving said engaging mechanism with respect to said second portion of said frame.

133. A wine pressing apparatus according to claim 132, wherein:
said first portion is held in a fixed position with respect to said second portion;
said engaging mechanism includes a tray for receiving said tank; and
said drive mechanism includes at least one lifting mechanism adapted to lift said tray with respect to said first portion of said frame.

134. A wine pressing apparatus according to claim 133, wherein said drive mechanism includes a plurality of lifting mechanisms.

135. A wine pressing apparatus according to claim 134, wherein said plurality of lifting mechanisms are arranged around the perimeter of said tray.

136. A wine pressing apparatus according to claim 132, wherein said drive mechanism comprises at least one powered cylinder.

137. A wine pressing apparatus according to claim 136, wherein said drive mechanism comprises at least one double-acting hydraulic cylinder.

138. A wine pressing apparatus according to claim 123, further comprising:
a plurality of independently controllable drive mechanisms; and wherein
said first portion of said frame is held stationary with respect to said tank;
said first portion of said frame is movably coupled to said second portion of said frame; and
said plurality of drive mechanisms moves said second portion of said frame with respect to said first portion of said frame.

139. A wine pressing apparatus according to claim 123, wherein:
said engaging mechanism includes a tray for receiving said tank; and said aligning mechanism further includes a plurality of concentric rings fixed to the base of said tray to receive tanks of varying sizes in a centered position with respect to said press plate.

140. A wine pressing apparatus according to claim 139, wherein each of said concentric rings is selectively removable from said tray.

141. A wine pressing apparatus according to claim 123, wherein each of said alignment blocks has a tapered upper end to guide said tank into alignment as said tank is lowered into said frame.

142. A wine pressing apparatus according to claim 123, further comprising a plurality of wheels fixed to said frame for transporting said wine pressing apparatus.

143. A wine pressing apparatus according to claim 123, wherein said frame further includes a plurality of guideways for receiving the forks of a lift truck.

144. A wine pressing apparatus according to claim 123, further comprising said tank, and wherein the inner surface of said tank is substantially continuous.

\* \* \* \* \*